(12) United States Patent
Kuno et al.

(10) Patent No.: US 8,782,407 B2
(45) Date of Patent: Jul. 15, 2014

(54) INFORMATION PROCESSING DEVICE, INFORMATION PROCESSING METHOD, AND PROGRAM

(75) Inventors: Hiroshi Kuno, Kanagawa (JP); Kenjiro Ueda, Kanagawa (JP); Takamichi Hayashi, Tokyo (JP); Munetake Ebihara, Kanagawa (JP); Koji Yoshimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 238 days.

(21) Appl. No.: 13/116,342

(22) Filed: May 26, 2011

(65) Prior Publication Data
US 2011/0320812 A1 Dec. 29, 2011

(30) Foreign Application Priority Data

Jun. 24, 2010 (JP) ................................. 2010-143361

(51) Int. Cl.
| | | |
|---|---|---|
| *H04L 29/06* | (2006.01) | |
| *G06F 21/33* | (2013.01) | |
| *H04L 9/08* | (2006.01) | |
| *H04L 9/32* | (2006.01) | |

(52) U.S. Cl.
CPC .............. *G06F 21/33* (2013.01); *H04L 9/0825* (2013.01); *H04L 9/3268* (2013.01); *H04L 63/0823* (2013.01)
USPC ........... 713/168; 713/156; 713/182; 713/194; 726/5; 726/16; 726/31

(58) Field of Classification Search
CPC ....................................................... G06F 21/33
See application file for complete search history.

(56) References Cited

U.S. PATENT DOCUMENTS

| | | | |
|---|---|---|---|
| 2007/0162964 A1 | 7/2007 | Wang et al. | |
| 2007/0300078 A1 | 12/2007 | Ochi et al. | |
| 2008/0089517 A1 | 4/2008 | Bianco et al. | |
| 2009/0089593 A1* | 4/2009 | Kuno et al. | ................... 713/193 |
| 2009/0232314 A1 | 9/2009 | Kato et al. | |
| 2010/0138652 A1* | 6/2010 | Sela et al. | ..................... 713/158 |

FOREIGN PATENT DOCUMENTS

| | | |
|---|---|---|
| EP | 1 777 628 A1 | 4/2007 |
| EP | 2 045 752 A2 | 4/2009 |
| JP | 2008-98765 | 4/2008 |
| WO | WO 2006/066604 A1 | 6/2006 |

OTHER PUBLICATIONS

U.S. Appl. No. 13/151,685, filed Jun. 2, 2011, Ueda, et al.
U.S. Appl. No. 13/155,638, filed Jun. 8, 2011, Ueda, et al.
Extended European Search Report issued Jul. 21, 2011, in Patent Application No. 11166932.1.

(Continued)

*Primary Examiner* — Shewaye Gelagay
(74) *Attorney, Agent, or Firm* — Oblon, Spivak, McClelland, Maier & Neustadt, L.L.P.

(57) ABSTRACT

An information processing device includes: a memory having a protected area which is a data recording area in which access restriction is set; and a data processing unit that determines accessibility in response to a request for accessing the protected area from an access requesting device, wherein the data processing unit verifies a device certificate received from the access requesting device and determines accessibility to the protected area based on access control information recorded in the device certificate.

12 Claims, 22 Drawing Sheets

(56) References Cited

OTHER PUBLICATIONS

"Advanced Access Content System (AACS): Recordable Video Book", Intel Corporation, http://web.archive.org/web/20060322184826/www.aacsla.com/specifications/specs091/AACS_Spec_Recordable_0.91.pdf, XP 2438246, Feb. 17, 2006, 23 pages.

"Advanced Access Content System (AACS): Introduction and Common Cryptographic Elements", Intel Corporation, http://web.archive.org/web/20060319164126/www.aacsla.com/specifications/specs091/AACS_Spec_Common_0.91.pdf, XP 2438245, Feb. 17, 2006, 82 pages.

* cited by examiner

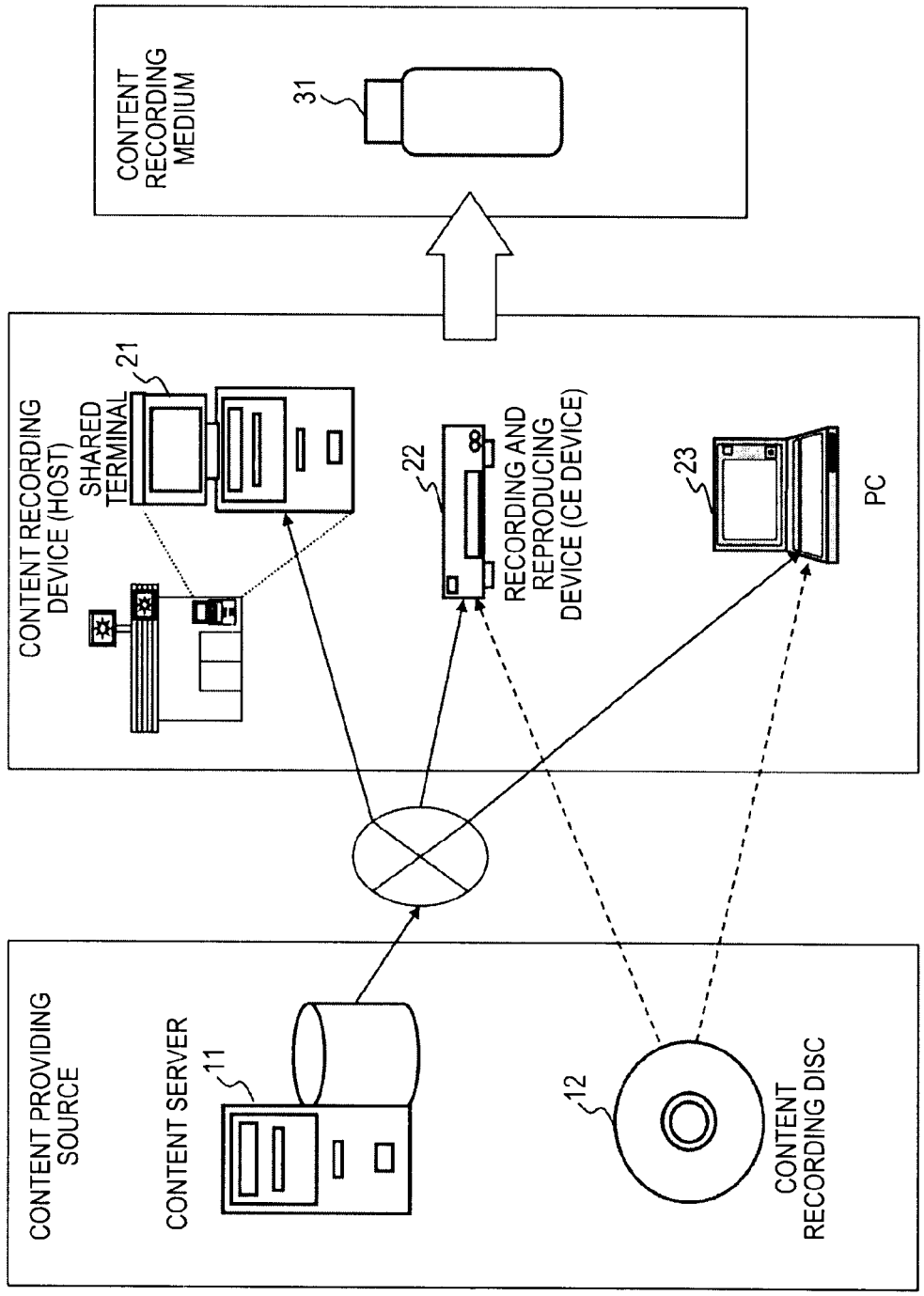

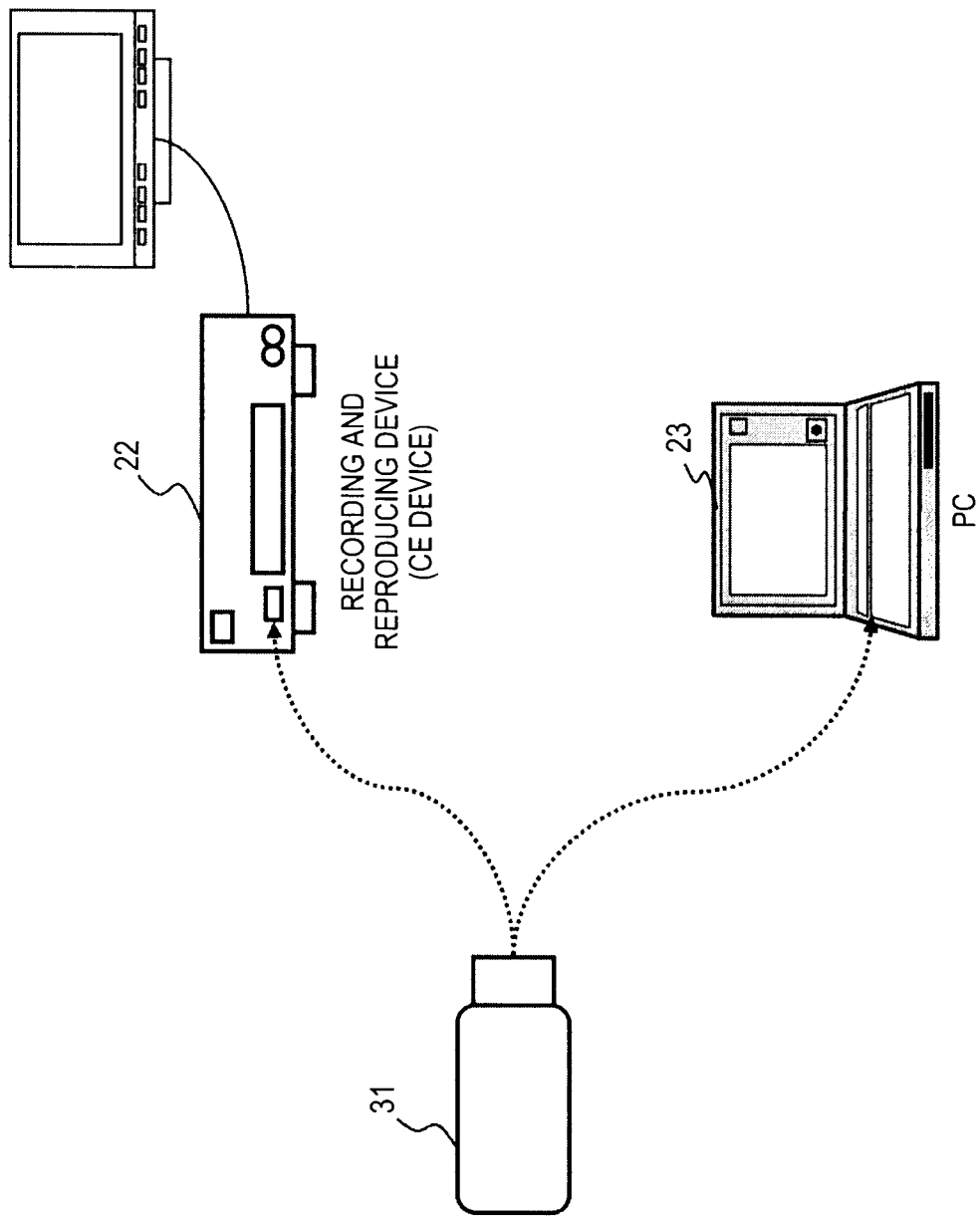

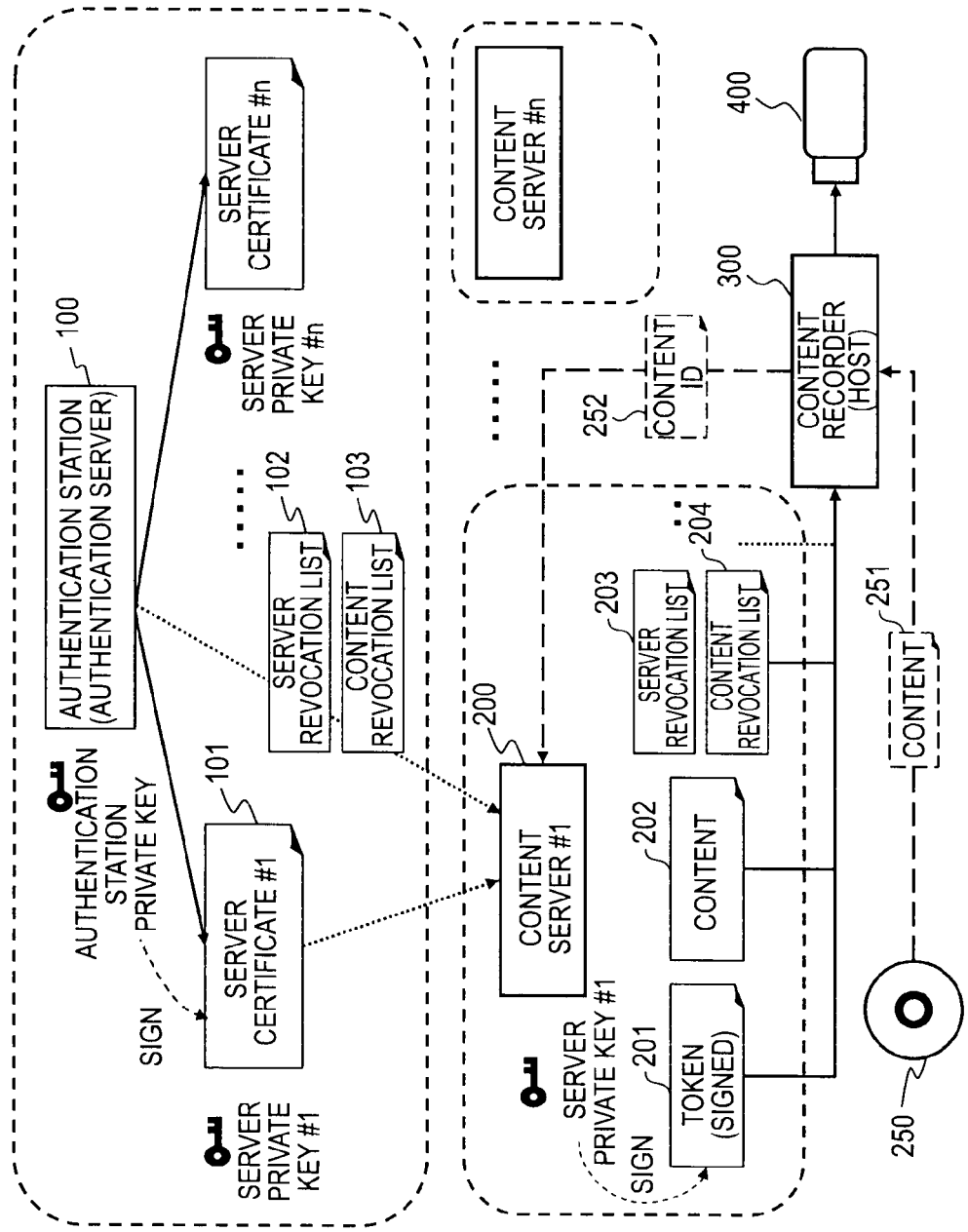

FIG.4A

SERVER REVOCATION LIST (SRL)

- VERSION NO. nnn
- REVOKED SERVER ID
  - S0011234
  - S1324533
  - S4435672
  - ...
- SIGNATURE (SIGNED WITH PRIVATE KEY OF AUTHENTICATION STATION)

AUTHENTICATION STATION PRIVATE KEY

FIG.4B

CONTENT REVOCATION LIST (CRL)

- VERSION NO. nnn
- REVOKED CONTENT ID
  - C567AC234
  - C99CDA533
  - C678BA672
  - ...
- SIGNATURE (SIGNED WITH PRIVATE KEY OF AUTHENTICATION STATION)

AUTHENTICATION STATION PRIVATE KEY

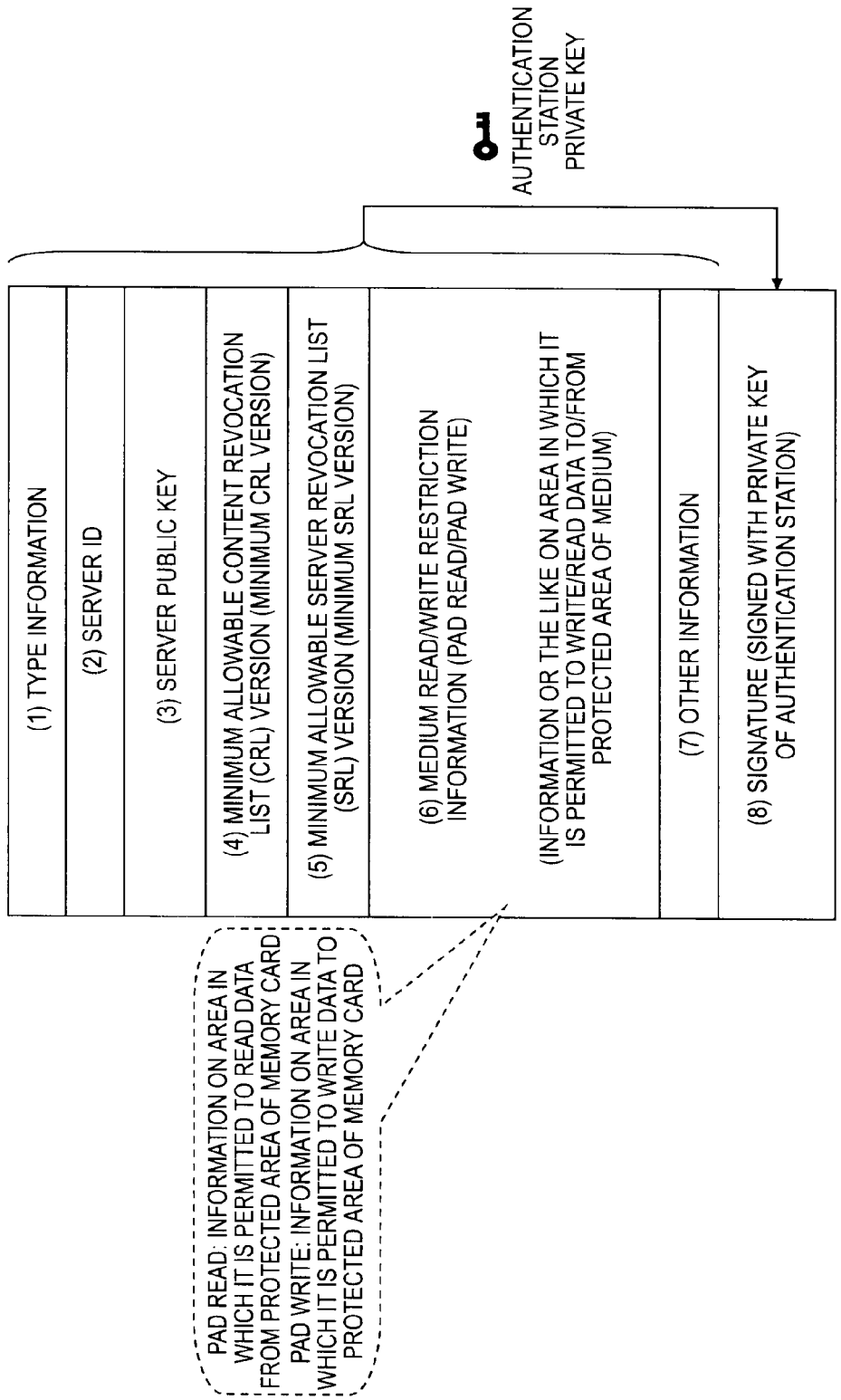

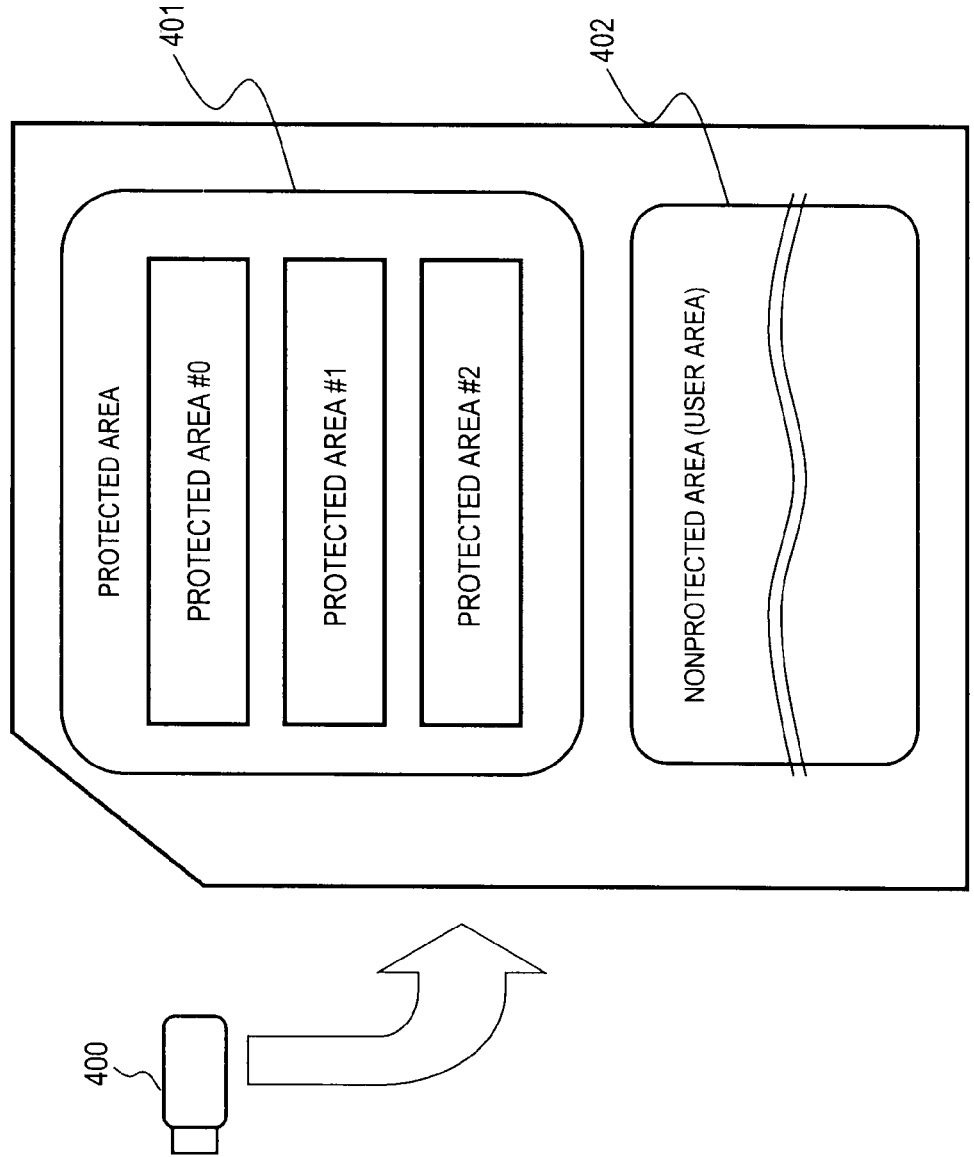

FIG.7

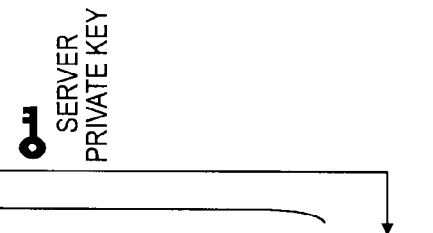

| | DATA RECORDED IN TOKEN | DESCRIPTION AND SPECIFIC EXAMPLE |
|---|---|---|
| (1) | MINIMUM ALLOWABLE CONTENT REVOCATION LIST (CRL) VERSION (MINIMUM CRL VERSION) | CONTENT REVOCATION LIST HAVING LOWER VERSION THAN THIS NUMBER IS REVOKED |
| (2) | MINIMUM ALLOWABLE SERVER REVOCATION LIST (SRL) VERSION (MINIMUM SRL VERSION) | SERVER REVOCATION LIST HAVING LOWER VERSION THAN THIS NUMBER IS REVOKED |
| (3) | VOLUME ID (PV VOLUME ID) | THIS ID IS IDENTIFIER (ID) CORRESPONDING TO CONTENT OF PREDETERMINED UNITS (FOR EXAMPLE, IN TITLE UNITS). THIS ID IS LIKELY TO BE USED BY BD-J/API, BD+API, OR THE LIKE INCLUDED IN RECORDING DATA. |
| (4) | CONTENT ID | SERVER ID + UNIQUE CONTENT ID SERVER ID IS SET BY AUTHENTICATION STATION CONTENT ID IS SET BY CONTENT SERVER |
| (5) | CONTENT HASH TABLE DIGEST(S) | DIGEST(S) OF HASH VALUE OF CONTENT (SUM) |
| (6) | USE CONTROL INFORMATION HASH VALUE (USAGE RULE HASH) | HASH VALUE OF USE CONTROL INFORMATION |
| (7) | TIME STAMP | INFORMATION ON DATE WHEN SIGNATURE IS SET |
| (8) | OTHER INFORMATION | |
| (9) | SIGNATURE | SIGNATURE SIGNED WITH PRIVATE KEY OF CONTENT SERVER ISSUED BY AUTHENTICATION STATION (SIGNATURE TO DATA RECORDED IN TOKEN) |

SERVER PRIVATE KEY

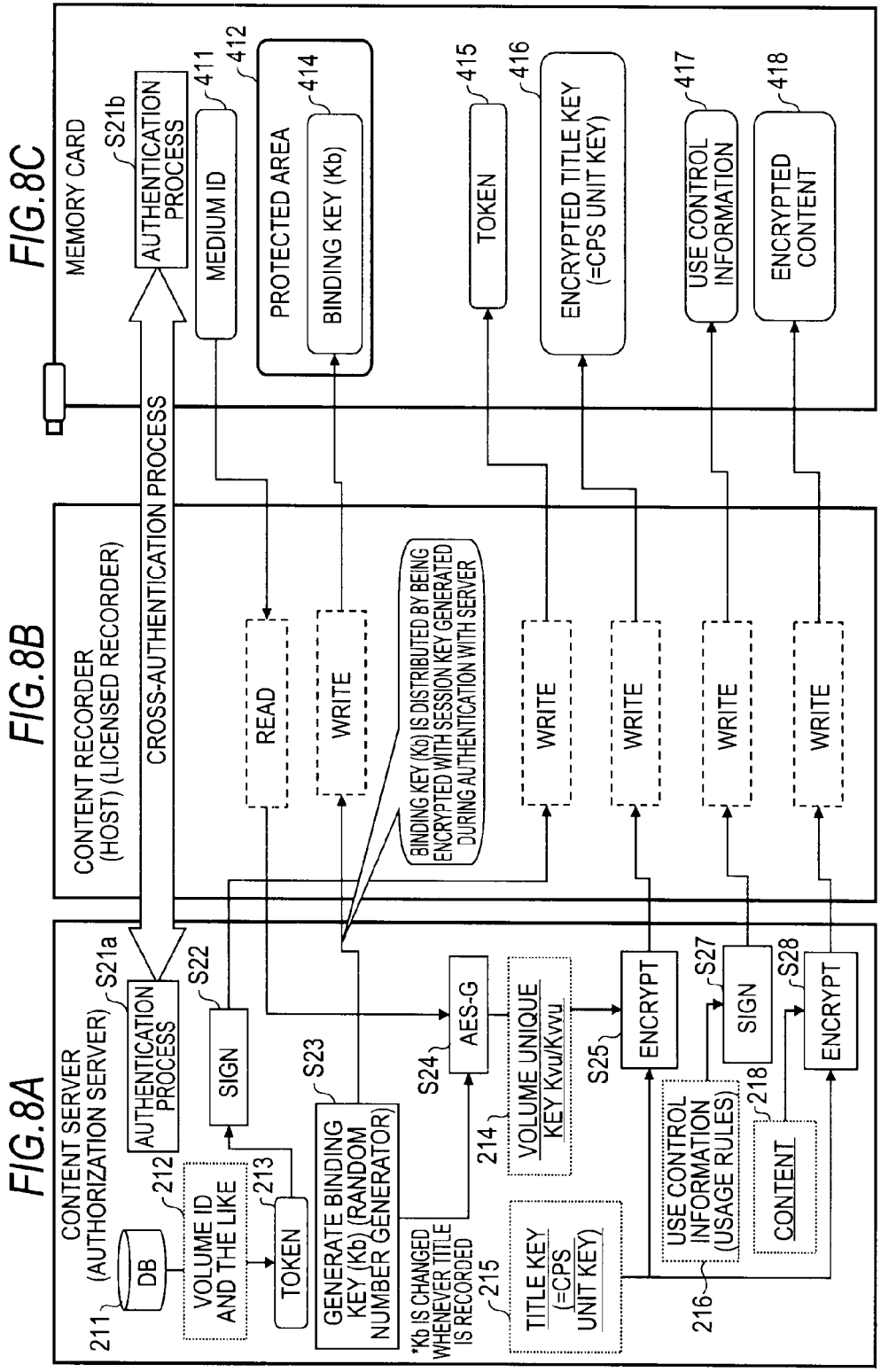

FIG.9
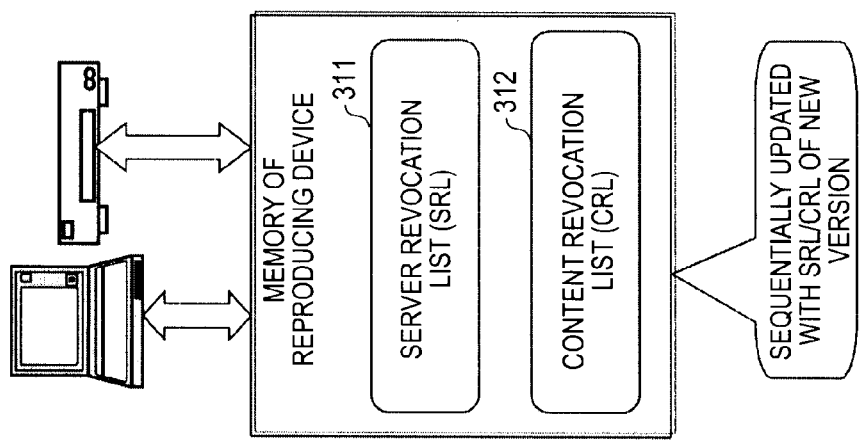
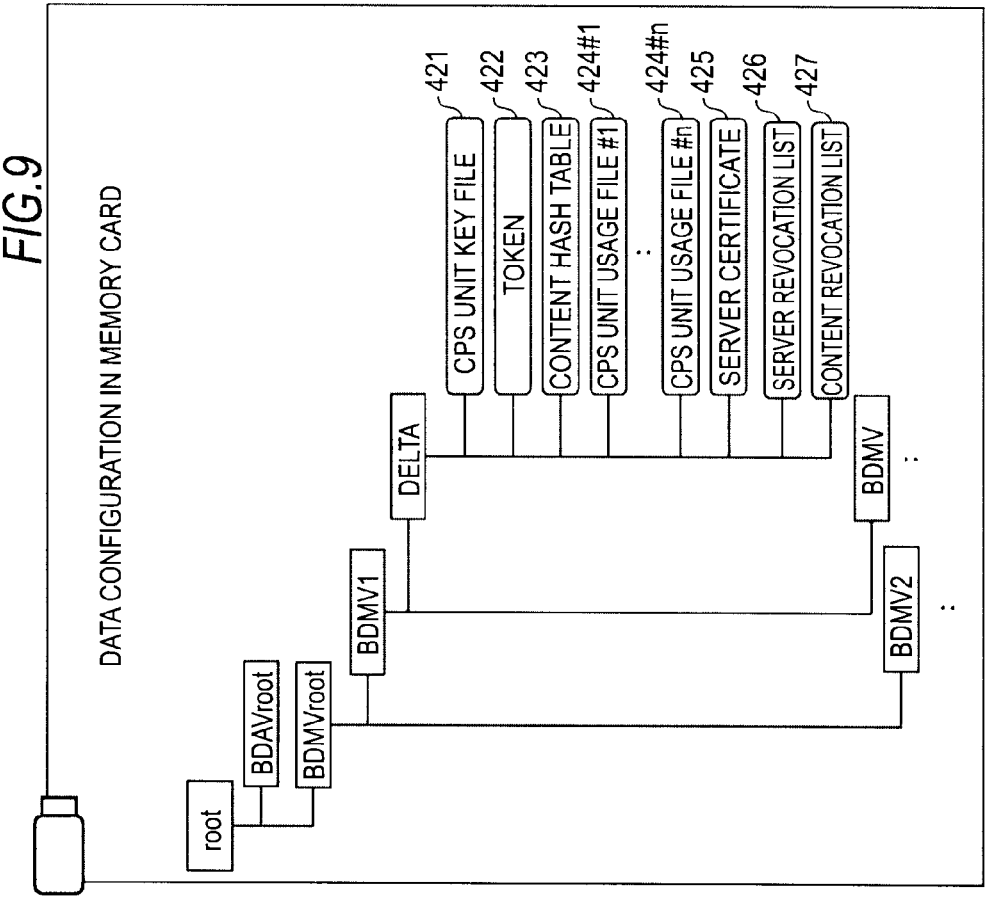

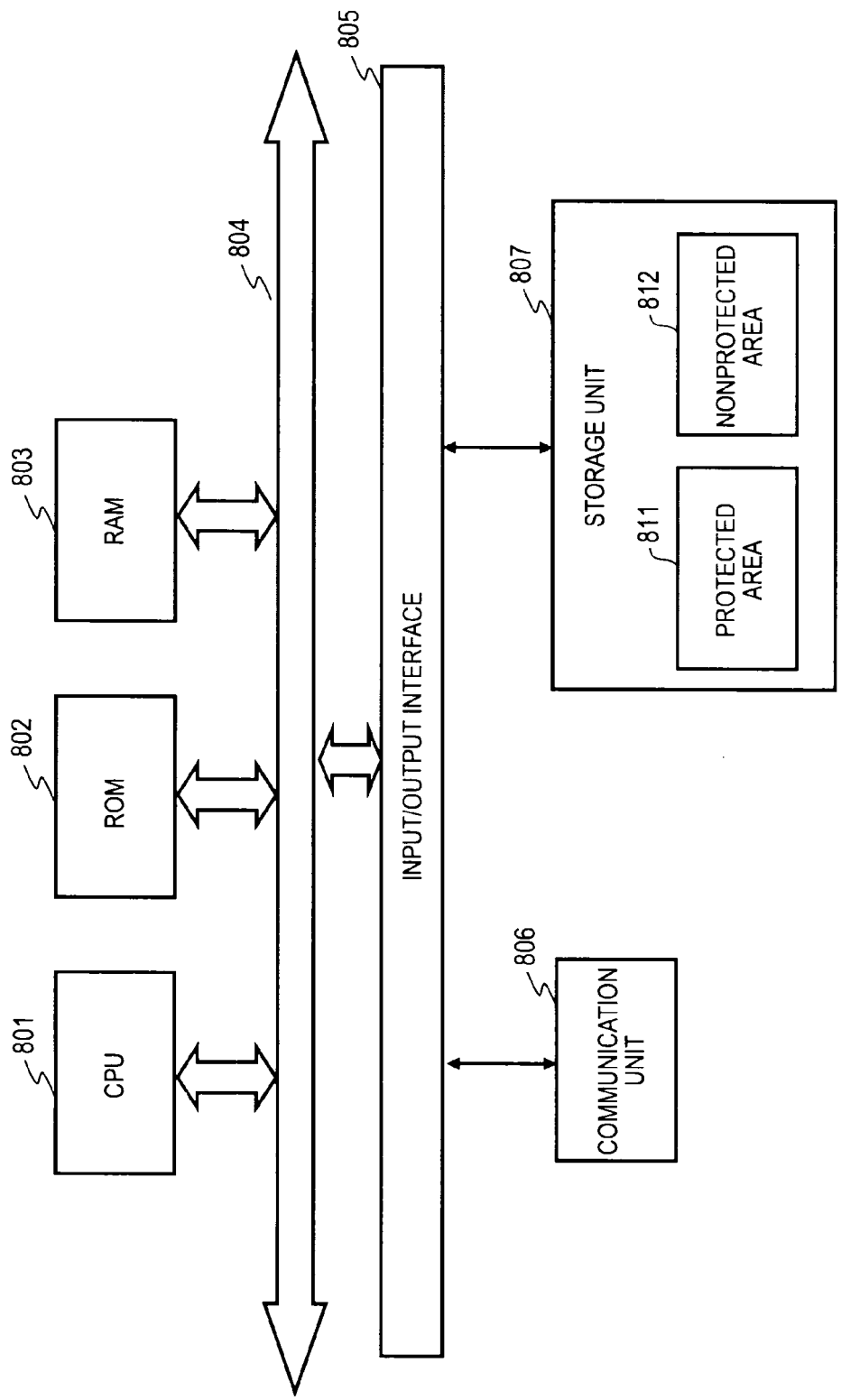

INFORMATION PROCESSING DEVICE, INFORMATION PROCESSING METHOD, AND PROGRAM

FIELD

The present disclosure relates to an information processing device, an information processing method, and a program. Particularly, the present disclosure relates to an information processing device, an information processing method, and a program for executing control on the process of writing or reading data to/from a specific protected area in which access restriction is set.

BACKGROUND

In recent years, various media such as a DVD (Digital Versatile Disc), a Blu-ray Disc™, or a flash memory have been used as information recording medium. In particular, in recent years, the use of memory cards such as a USB memory mounting a large-capacity flash memory thereon has been popularized. Users can record content such as music or movies on various information recording media, load the media into a reproducing device (player), and reproduce the content.

However, copyrights, distribution rights, and the like of most content such as music data or image data are possessed by the authors or sellers thereof. Therefore, when content is provided to users, certain restrictions on use are generally set. That is, use of content is permitted only to users having a legitimate right to use, whereas unregulated use such as copying without consent is not permitted.

For example, AACS (Advanced Access Content System) is known as a standard for controlling the use of content. The AACS standard defines a use control system for content recorded on a Blu-ray Disc™, for example. Specifically, the AACS standard specifies an algorithm or the like in which encrypted content is recorded, for example, on the Blu-ray Disc™, and which makes it possible to restrict users capable of acquiring an encryption key for the encrypted content only to legitimate users.

However, the present AACS specification has a specification for a use control system of content recorded on discs such as a Blu-ray Disc™ but does not have sufficient specification for content recorded on flash memories such as, for example, a memory card. Thus, there is a possibility that copyright protection of content recorded on such a memory card is not sufficient. Therefore, there is a demand for establishing a use control system for controlling the use of content using media such as a memory card.

For example, the AACS standard specifies the following specifications as a use control system for content recorded on discs such as a Blu-ray Disc™.

(a) A specification for the use of content copied from a medium (for example, a ROM disc), on which content is already recorded, to a disc such as a Blu-ray Disc™; and (b) A specification for the use of content which is downloaded from a server and recorded on a disc such as a Blu-ray Disc™.

For example, the AACS specification specifies the use control of such content.

The AACS standard specifies Managed Copy (MC) in which when content is copied between a medium in accordance with the specification (a), the copying is permitted only when copy permission information is acquired from a management server.

Moreover, the AACS standard specifies various download types as the process of downloading content from a server in accordance with the specification (b). Examples of the download types include EST (Electric Sell Through) which uses user devices such as a PC and MoD (Manufacturing on Demand) which uses shared terminals installed in a convenience store or the like. Even when recording and using content on a disc through these downloading processes, it is necessary to perform the processes in accordance with predetermined rules.

These processes ate disclosed in JP-A-2008-98765, for example.

However, as described above, the AACS standard is intended to control the use of content recorded on discs such as a Blu-ray Disc™ but does not have a sufficient specification for controlling the use of content recorded on flash memory-type memory cards including USB memories and the like.

SUMMARY

It is desirable to provide an information processing device, an information processing method, and a program capable of establishing a use control system when recording and using content on information recording media other than discs, such as flash memories, to thereby prevent illegal use of content.

It is also desirable to provide an information processing device, an information processing method, and a program for executing control on the process of writing or reading data to/from a specific protected area in which access restriction is set.

An embodiment of the present disclosure is directed to an information processing device including: a memory having a protected area which is a data recording area in which access restriction is set; and a data processing unit that determines accessibility in response to a request for accessing the protected area from an access requesting device, wherein the data processing unit verifies a device certificate received from the access requesting device and determines accessibility to the protected area based on access control information recorded in the device certificate.

In the information processing device of the embodiment of the present disclosure, the data processing unit may verify the device certificate received from the access requesting device and determine accessibility to each segment area of the protected area based on the access control information for each of the segment areas of the protected area recorded in the device certificate.

In the information processing device of the embodiment of the present disclosure, the data processing unit may verify the device certificate received from the access requesting device and determines availability of a data writing process and a data reading process on each segment area of the protected area based on the access control information of the data writing process and the data reading process for each of the segment areas of the protected area recorded in the device certificate.

In the information processing device of the embodiment of the present disclosure, the data processing unit may verify the device certificate received from the access requesting device and determines accessibility to each segment area of the protected area based on type information of the access requesting device recorded in the device certificate.

In the information processing device of the embodiment of the present disclosure, the data processing unit may verify a signature set in the device certificate received from the access requesting device and determine accessibility to the protected area based on the access control information recorded in the device certificate only when the validity of the device certificate is confirmed through signature verification.

In the information processing device of the embodiment of the present disclosure, the data processing unit may record key information which is used for reproducing encrypted content in a segment area within the protected area, which is determined to be a data writable area based on the device certificate received from the access requesting device.

In the information processing device of the embodiment of the present disclosure, the data processing unit may record the key information which is used for reproducing encrypted content in a segment area within the protected area, which is determined to be the data writable area based on a server certificate received from a server that provides content management data.

In the information processing device of the embodiment of the present disclosure, the data processing unit may execute a process of reading the key information used for reproducing encrypted content from the segment area within the protected area, which is determined to be a data readable area based on a host certificate received from a host device that executes a content reproducing process and providing the read key information to the host device.

In the information processing device of the embodiment of the present disclosure, the protected area may be segmented into a plurality of segment areas, and the data processing unit may execute a recording process using different segment areas depending on the type of recording data.

In the information processing device of the embodiment of the present disclosure, the information processing device may be a flash memory-type memory card.

Another embodiment of the present disclosure is directed to a data recording control system including: a server that provides key information which is used for reproducing encrypted content; and an information processing device that records data provided by the server, wherein the information processing device includes a memory having a protected area which is a data recording area in which access restriction is set, and a data processing unit that determines accessibility in response to a request for accessing the protected area from the server, wherein the data processing unit verifies a server certificate received from the server, selects a segment area in which the server is permitted to write data based on access control information recorded in the server certificate, and records the key information in the selected segment area.

Still another embodiment of the present disclosure is directed to an information processing method for executing access control in an information processing device which includes a memory having a protected area which is a data recording area in which access restriction is set, the method including: permitting a data processing unit to determine accessibility in response to a request for accessing the protected area from an access requesting device, wherein the permitting involves verifying a device certificate received from the access requesting device and determining accessibility to the protected area based on access control information recorded in the device certificate.

Yet another embodiment of the present disclosure is directed to a program for executing access control in an information processing device which includes a memory having a protected area which is a data recording area in which access restriction is set, the program including: permitting a data processing unit to determine accessibility in response to a request for accessing the protected area from an access requesting device, wherein the permitting involves verifying a device certificate received from the access requesting device and determining accessibility to the protected area based on access control information recorded in the device certificate.

The program according to the embodiment of the present disclosure is a computer program which can be provided to an information processing device and a computer system capable of executing various program codes by a recording medium or a communication medium in a computer-readable manner. By providing the program in the computer-readable manner, processes corresponding to the program are carried out by the information processing device and the computer system.

Other advantages, features, and effects of the embodiments of the present disclosure will become apparent from the following detailed description based on specific embodiments of the present disclosure or the accompanying drawings. A system referred to in this specification means a logical set of plural devices and is not limited to a configuration in which the devices are disposed in the same chassis.

As described above, according to the embodiments of the present disclosure, a system that controls writing and reading of data to/from an access restricted area set in a medium is provided. The information processing device according to the embodiment of the present disclosure includes a memory having a protected area which is a data recording area in which access restriction is set; and a data processing unit that determines accessibility in response to a request for accessing the protected area from an access requesting device. The data processing unit verifies a device certificate received from the access requesting device and determines accessibility to the protected area based on access control information recorded in the device certificate. For example, the availability of writing and reading of data to/from each of the segment areas of the protected area is determined based on the access control information for each segment area of the protected area. Through this process, the access of each device to each segment area is controlled.

BRIEF DESCRIPTION OF THE DRAWINGS

FIGS. 1A to 1C are diagrams illustrating an outline of a content providing and utilizing process.

FIG. 2 is a diagram illustrating a use type of content recorded on a memory card.

FIG. 3 is a diagram illustrating a server management configuration and data provided from a server.

FIGS. 4A and 4B are diagrams illustrating a server revocation list (SRL) and a content revocation list (CRL), respectively.

FIG. 5 is a diagram illustrating a server certificate.

FIG. 6 is a diagram illustrating a specific configuration example of a storage area of a memory card.

FIG. 7 is a diagram illustrating a specific example of a data configuration of a token generated and provided by a content server.

FIGS. 8A to 8C are diagrams illustrating processes performed between a server and a memory card and data stored in the memory card.

FIG. 9 is a diagram illustrating a directory structure showing data recorded in a memory card and an example of data recorded in a reproducing device that executes a content reproducing process.

FIG. 22 is a diagram illustrating an example of a hardware configuration of a memory card.

DETAILED DESCRIPTION

Figure 10:
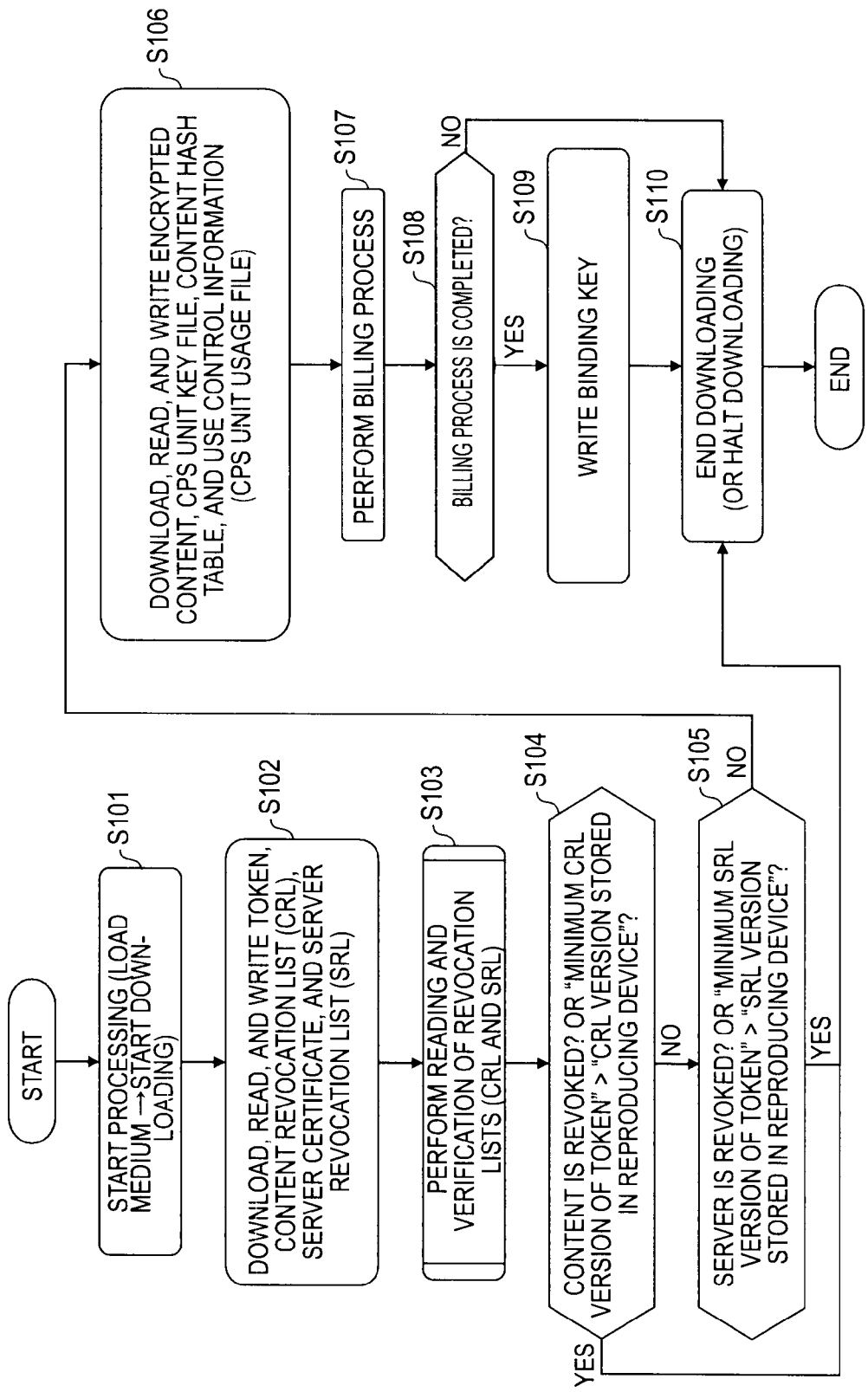
FIG. 10 is a flowchart illustrating a process sequence of downloading content from a content server and recording the content on a memory card.

Hereinafter, details of an information processing device, an information processing method, and a program according to embodiments of the present disclosure will be described with reference to the drawings. The description will be given in the following order.

1. Outline of content providing and utilizing process
2. Server management configuration and data provided from server
3. Token provided by server as content management information
4. Processes between server and memory card and data stored in memory card
5. Sequence of process of downloading content from server
6. Content reproducing process sequence
7. Configuration and process for restricting access to protected area of memory card
8. Example of hardware configuration of respective devices

[1. Outline of Content Providing and Utilizing Process]

Hereinafter, details of an information processing device, an information processing method, and a program according to embodiments of the present disclosure will be described with reference to the drawings.

First, the outline of a content providing and utilizing process will be described with reference to FIGS. 1A to 1C.

In FIGS. 1A to 1C, (a) content providing source, (b) content recorder (host), and (c) content recording medium are shown from left to right.

The (c) content recording medium is a medium which users use to record content thereon and reproduce content therefrom. In this specification, a memory card 31 which is an information recording device such as, for example, a flash memory is shown as an example.

Users record and use various types of contents such as, for example, music or movies on the memory card 31. These contents are copyright management contents, for example, which are subject to use control. The use thereof is permitted only under predetermined use conditions, and basically, an unregulated copying process, unlimited distribution of copied data, and the like are inhibited. Although this will be described later, when content is recorded on the memory card 31, use control information (Usage Rule) corresponding to the content is also recorded. Specifically, use control information (Usage Rule) that specifies copy restriction information such as an allowable copy count is also recorded.

The (a) content providing source is the source that provides source of content such as music or movies in which use restriction is set. In FIGS. 1A to 1C, a content server 11 and a content recording disc 12 such as a ROM disc on which content is already recorded are shown.

The content server 11 is a server that provides content such as music or movies. The content recording disc 12 is a disc such as a ROM disc on which content such as music or movies is already recorded.

Users can load the memory card 31 which is the (c) content recording medium into the (b) content recorder (host), connect to the content server 11 through the (b) content recorder (host) to receive (download) content, and record the content on the memory card 31.

During the downloading process, the content server 11 performs processes in accordance with a predetermined sequence and provides use control information, tokens, and content management information such as key information (binding key) in addition to encrypted content. These processes and provided data will be described in detail later.

Alternatively, users can load the content recording disc 12 such as a ROM disc, on which content is already recorded, into the (b) content recorder (host) in which the memory card 31 which is the (c) content recording medium is loaded and copy the content recorded on the content recording disc 12 on the memory card 31. However, in the case of executing this copying process, the users also need to connect to the content server 11 and perform processes in accordance with a predetermined sequence. During the process of copying content from the disc, the content server 11 provides the use control information and tokens corresponding to the copied content and content management information such as key information (binding key).

The (b) content recorder (host) loads the memory card 31 which is the (c) content recording medium therein and records content received (downloaded) through a network from the content server 11 which is the (a) content providing source or content read from the content recording disc 12 on the memory card 31.

Examples of the (b) content recorder (host) include a shared terminal 21 installed in a public space, such as, for example, a station or a convenience store, which can be used by a number of unspecified users, and a recording and reproducing device (Consumer Electronic (CE) device) 22 and a PC 23 which are user devices. These examples are devices capable of loading the memory card 31 which is the (c) content recording medium therein.

Moreover, these (b) content recorders (hosts) are capable of executing data transmitting and receiving processes through a network when they are configured to execute the process of downloading content from the content server 11.

The content recorders need to be devices capable of reproducing discs when they use the content recording disc 12.

As shown in FIGS. 1A to 1C, users record content downloaded from the content server 11 which is the (a) content providing source shown or content which is recorded on the content recording disc 12 such as a ROM disc on the memory card 31 which is the (c) content recording medium through the (b) content recorder (host).

The type of use of the content recorded on the memory card 31 will be described with reference to FIG. 2.

The users load the memory card 31 having content recorded thereon, for example, into the recording and reproducing device (CE device) 22, the PC 23, or the like which is the (b) content recorder (host) described with reference to FIG. 1B and read and reproduce the content recorded on the memory card 31.

In many cases, these contents are recorded as encrypted contents, and a reproducing device such as the recording and reproducing device (CE device) 22 or the PC 23 reproduces the content after executing a decoding process in accordance with a predetermined sequence.

In addition, a device that reproduces the content recorded on the memory card 31 is not limited to the (b) content recorder (host) described with reference to FIG. 1B but may be other reproducing devices (players). However, the devices need to be capable of executing a process of decoding encrypted content in accordance with a predetermined sequence, for example. That is, the devices need to store a program for executing a predetermined reproducing process sequence. The details of a content reproducing sequence will be described later.

[2. Server Management Configuration and Data Provided from Server]

Next, a server management configuration and data provided from a server will be described with reference to FIG. 3 and its subsequent drawings.

FIG. 3 shows a memory card 400 of a user which is a content recording destination, a content recorder (host) 300 that executes a content recording process, a content server 200 that provides content and content management data, an authentication station (authentication server) 100 that is set as a management station of the content server 200, and a disc 250 on which content is recorded.

The memory card 400 shown in FIG. 3 corresponds to the memory card 31 shown in FIGS. 1C and 2, and the content recorder (host) 300 shown in FIG. 3 corresponds to the content recorder (host) shown in FIG. 1B.

Moreover, the content server 200 shown in FIG. 3 corresponds to the content server 11 shown in FIG. 1A, and the disc 250 shown in FIG. 3 corresponds to the disc 12 shown in FIG. 1A.

There is a plurality of content servers 200 as indicated by content server #1 to content server #n in FIG. 3. The content recorder (host) 300 in which the memory card 400 is loaded connects to these various content servers to acquire content and content management data and record the same on the memory card 400.

The authentication station (authentication server) 100 shown in FIG. 3 provides the following data to the respective content servers #1 to #n providing content and content management data:

(a) server certificate in which a server public key is stored;
(b) server private key;
(c) server revocation list (SRL) which is the list of server IDs of revoked servers; and
(d) content revocation list (CRL) which is the list of content IDs of revoked contents.

Each of the content servers #1 to #n receives these data from the authentication station 100 and stores the same in an internal memory of the server. In the following description, since the content servers #1 to #n perform the same processes, the process of the content server #1 will be described as a representative example. In addition, the content server #1 will be described as the content server 200.

When executing the process of providing content to the memory card 400, the content server 200 encrypts and provides content 202 as encrypted content as well as a token 201 used as content management information, a server revocation list (SRL) 203, a content revocation list (CRL) 204, and an encryption key (binding key) and the like to be used for decoding the content, which is not shown in the drawing, to the content recorder (host) 300 and records them on the memory card 400 together with the content.

In addition, when the user loads the disc 250 into the content recorder (host) 300 and records (copies) the content stored in the disc 250 on the memory card 400, the content recorder (host) 300 obtains permission to copy from the content server 200 and executes copying of content. To realize this process, the content recorder (host) 300 acquires a content ID, for example, which is an identifier of content to be copied, from the disc 250 and transmits the content ID to the content server 200.

The content stored in the disc 250 is also encrypted content. In addition to keys used for decoding the content, the token 201 as content management data shown in FIG. 3, the server revocation list (SRL) 203, the content revocation list (CRL) 204, and the like are provided from the content server 200 to the content recorder (host) 300. These data are recorded on the memory card 400 together with the content as the management data corresponding to the content provided from the disc 250.

First, as described above, the authentication station 100 provides a server revocation list (SRL) 102, a content revocation list (CRL) 103, and a server certificate (Server Cert) 101 to the respective content servers as shown in FIG. 3.

A detailed configuration example of these data will be described with reference to FIGS. 4A and 4B.

First, a server revocation list (SRL) and a content revocation list (CRL) will be described with reference to FIGS. 4A and 4B.

FIGS. 4A and 4B show a data configuration example of (a) server revocation list (SRL) and (b) content revocation list (CRL), respectively.

The (a) server revocation list (SRL) is a list in which identifiers (IDs) of revoked servers (content servers) are recorded and is a list issued by the authentication station 100.

The server revocation list (SRL) is a list in which the server IDs of content servers in which an illegal process such as, for example, illegal distribution of content is detected are recorded. The server revocation list is sequentially updated upon detection or the like of a new illegal server.

In the server revocation list (SRL), a version number is set as shown in FIG. 4A. The version number increases, for example, from 001 to 002, 003, and the like whenever a new list is issued. That is, the version number of a newer server revocation list (SRL) is set so as to be greater than the version number of an older server revocation list (SRL).

In the server revocation list (SRL), a version number and the server IDs of revoked servers are recorded, and a signature based on a private key of the authentication station is generated and recorded with respect to these data. Through this signing process, falsification of data is prevented.

In the case of using the server revocation list (SRL), signature verification is first executed so as to check the validity of the server revocation list (SRL) before using the list. In addition, signature verification is executed using the public key of the authentication station.

The server revocation list (SRL) is also recorded on a memory card that records content and a memory of a reproducing device that reproduces content, such as, for example, the recording and reproducing device 22 or the PC 23 shown in FIG. 2.

The reproducing device acquires the server ID of a server from which reproduction content and content management data are received when reproducing content and verifies whether the acquired server ID is recorded as a revoked server in the server revocation list (SRL) stored in the memory of the reproducing device. In addition, the server ID can be acquired from a server certificate which is received from the server as management data of content, for example.

If the server ID of the server from which reproduction target content and content management data are received is recorded in the server revocation list (SRL), reproduction of the content is inhibited since there is a possibility that the content is content provided by an illegal server.

A reproduction processing program for executing such a process is provided to the reproducing device in advance, and the process corresponding to the reproduction processing program is executed when performing a content reproducing process. That is, before performing the content reproducing process, the reproducing device executes a process of checking the version number of a server revocation list (SRL) used by the reproducing device and confirming that a server which provided the content being used and the content management data is not revoked based on the server revocation list (SRL). A content reproducing sequence will be described later with reference to a flowchart.

The (b) content revocation list (CRL) is a list in which identifiers (IDs) of revoked contents are recorded and is a list issued by the authentication station 100. The content revocation list (CRL) is a list which is generated, for example, when illegal circulation of copied contents is detected and in which the content IDs of the illegally circulated contents are recorded. The content revocation list is sequentially updated upon detection or the like of a new illegal content.

In the content revocation list (CRL), a version number is set as shown in FIG. 4B. The version number increases, for example, from 001 to 002, 003, and the like whenever a new list is issued. That is, the version number of a newer content revocation list (CRL) is set so as to be greater than the version number of an older content revocation list (CRL).

In the content revocation list (CRL), a version number and the content IDs of revoked contents are recorded, and a signature based on a private key of the authentication station is generated and recorded with respect to these data. Through this signing process, falsification of data is prevented.

In the case of using the content revocation list (CRL), signature verification is first executed so as to check the validity of the content revocation list (CRL) before using the list. In addition, signature verification is executed using the public key of the authentication station.

The content revocation list (CRL) is also recorded on a memory card that records content and a memory of a reproducing device that reproduces content, such as, for example, the recording and reproducing device 22 or the PC 23 shown in FIG. 2.

The reproducing device acquires the content ID of reproduction content when reproducing content and verifies whether the acquired content ID is recorded as a revoked content in the content revocation list (CRL) stored in the memory of the reproducing device. In addition, the content ID can be acquired from a content certificate which is received from a server (or read from a disc) as management data of content, for example.

If the content ID of the reproduction target content is recorded in the content revocation list (CRL), reproduction of the content is inhibited since the content is revoked content.

In addition, a reproduction processing program for executing such a process is provided to the reproducing device in advance, and the process corresponding to the reproduction processing program is executed when performing a content reproducing process. That is, before performing the content reproducing process, the reproducing device executes a process of checking the version number of a content revocation list (CRL) used by the reproducing device and confirming that the content being used is not revoked based on the content revocation list (CRL). The content reproducing sequence will be described later with reference to a flowchart.

Next, the server certificate 101 which the authentication station 100 provides to the respective content servers will be described with reference to FIG. 5.

The server certificate 101 which the authentication station 100 provides to the respective content servers is a certificate which the authentication station 100 issues to a server which is permitted to perform a content providing process and is a certificate in which a server public key and the like are stored. The server certificate 101 is signed by the private key of the authentication station 100 and is configured as data of which falsification is prevented.

FIG. 5 shows a specific example of the server certificate 101 which the authentication station 100 provides to the respective content servers.

As shown in FIG. 5, the server certificate includes the following data:

(1) type information;
(2) server ID;
(3) server public key;
(4) minimum allowable content revocation list (CRL) version (Minimum CRL Version);
(5) minimum allowable server revocation list (SRL) version (Minimum SRL Version);
(6) medium read/write restriction information (PAD Read/PAD Write); and
(7) other information; and
(8) signature.

The respective data (1) to (8) will be described below.

(1) Type Information

The type information is information representing the type of certificate or the type of content server. For example, data indicating that the certificate is a server certificate and information representing the type of server, for example, indicating that the server is a music content providing server or the server is a movie content providing server are recorded as the type information.

(2) Server ID

The server ID is an area in which a server ID as server identification information is recorded.

(3) Server Public Key

The server public key is the public key of a server. The server public key constitutes the key pair corresponding to a public key encryption method together with a server private key.

(4) Minimum Allowable Content Revocation List (CRL) Version (Minimum CRL Version)

The minimum allowable content revocation list (CRL) version (Minimum CRL Version) is the minimum version number which a reproducing device is permitted to use among the version numbers set in the content revocation list (CRL) which is the list of revoked contents described with reference to FIG. 4B. That is, the minimum allowable content revocation list (CRL) version (Minimum CRL Version) is an area in which the minimum version number which a reproducing device is permitted to use when verifying revocation of content is recorded. The reproducing device is obliged to execute the verifying process as a preliminary process of the content reproducing process.

As described above, a version number is set in the content revocation list (CRL) as shown in FIG. 4B. The version number increases, for example, from 001 to 002, 003, and the like whenever a new list is issued. That is, the version number of a newer content revocation list (CRL) is set so as to be greater than the version number of an older content revocation list (CRL).

The reproducing device acquires the content ID of reproduction content when reproducing content and verifies whether the acquired content ID is recorded as a revoked content in the content revocation list (CRL) stored in the memory of the reproducing device. If the content ID of the reproduction target content is recorded in the content revocation list (CRL), reproduction of the content is inhibited since there is a possibility that the content is illegal content such as, for example, illegally copied content.

However, if the reproducing device determines the reproducibility of content by referencing a content revocation list (CRL) of an old version, there is a problem in that reproduction of content which is revoked after the old CRL was issued is typically permitted.

In order to prevent such a problem, the minimum version number of the content revocation list (CRL) which the reproducing device is permitted to use is set. This data is the minimum allowable content revocation list (CRL) version (Minimum CRL Version) recorded in the server certificate shown in FIG. 5. In addition, the minimum allowable content revocation list (CRL) version (Minimum CRL Version) is also recorded in a token described later.

During the content reproducing process, the reproducing device is not permitted to use a content revocation list (CRL) having a lower version number than the minimum allowable content revocation list (CRL) version (Minimum CRL Version), namely an old content revocation list (CRL). In addition, a reproduction processing program for executing such a process is provided to the reproducing device in advance, and the process corresponding to the reproduction processing program is executed when performing a content reproducing process. The content reproducing sequence will be described later with reference to a flowchart.

(5) Minimum Allowable Server Revocation List (SRL) Version (Minimum SRL Version)

The minimum allowable server revocation list (SRL) version (Minimum SRL Version) is the minimum version number which a reproducing device is permitted to use among the version numbers set in the server revocation list (SRL) which is the list of revoked servers (content servers) described with reference to FIG. 4A. That is, the minimum allowable server revocation list (SRL) version (Minimum SRL Version) is an area in which the minimum version number which a reproducing device is permitted to use when verifying revocation of servers is recorded. The reproducing device is obliged to execute the verifying process as a preliminary process of the content reproducing process.

As described above, a version number is set in the server revocation list (SRL) as shown in FIG. 4A. The version number increase, for example, from 001 to 002, 003, and the like whenever a new list is issued. That is, the version number of a newer server revocation list (SRL) is set so as to be greater than the version number of an older server revocation list (SRL).

The reproducing device acquires the server ID of a server from which reproduction content and content management data are received when reproducing content and verifies whether the acquired server ID is recorded as a revoked server in the server revocation list (SRL) stored in the memory of the reproducing device. If the server ID of the server from which reproduction target content and content management data are received is recorded in the server revocation list (SRL), reproduction of the content is inhibited since there is a possibility that the content is content provided by an illegal server.

However, if the reproducing device determines the reproducibility of content by referencing a server revocation list (SRL) of an old version, there is a problem in that reproduction of content provided by a server (content server) which is revoked after the old SRL was issued is typically permitted.

In order to prevent such a problem, the minimum version number of the server revocation list (SRL) which the reproducing device is permitted to use is set. This data is the minimum allowable server revocation list (SRL) version (Minimum SRL Version) recorded in the server certificate shown in FIG. 5. In addition, the minimum allowable server revocation list (SRL) version (Minimum SRL Version) is also recorded in a token described later.

During the content reproducing process, the reproducing device is not permitted to use a server revocation list (SRL) having a lower version number than the minimum allowable server revocation list (SRL) version (Minimum SRL Version), namely an old server revocation list (SRL). In addition, a reproduction processing program for executing such a process is provided to the reproducing device in advance, and the process corresponding to the reproduction processing program is executed when performing a content reproducing process. The content reproducing sequence will be described later with reference to a flowchart.

(6) Medium Read/Write Restriction Information (Pad Read/Pad Write)

In the medium read/write restriction information (PAD Read/PAD Write), information on a segment area in a protected area (PDA) is recorded. The segment area is an area in which reading or writing of data is permitted. The protected area (PDA) is set in a storage area of a medium recording content, for example, the storage area of the memory card 31 shown in FIGS. 1A to 10 and 2 or the memory card 400 shown in FIG. 3.

A specific configuration example of a storage area of the memory card 400 is shown in FIG. 6.

The storage area of the memory card 400 includes two areas of (a) protected area 401 and (b) nonprotected area (User Area) 402 as shown in FIG. 6.

The (b) nonprotected area (User Area) 402 is an area which a recording and reproducing device used by a user can freely access and on which content, general content management data, and the like are recorded. That is, users can freely write or read data to/from the nonprotected area (User Area) 402.

On the other hand, the (a) protected area 401 is an area in which unrestricted access is not permitted.

For example, when a recording and reproducing device or a reproducing device used by a user or a server or the like connected through a network performs writing or reading of data, the availability of reading or writing is determined depending on the respective devices in accordance with a program stored in advance in the memory card 400.

The memory card 400 includes a data processing unit for executing the program stored in advance and an authentication processing unit for executing an authentication process. First, the memory card 400 performs a process of authenticating a device that tries to write or read data to/from the memory card 400.

In the authentication process, a device certificate (for example, a server certificate (Server Cert)) such as a public key certificate is received from a counterpart device, namely an access requesting device, and it is determined whether access to the respective segment areas of the protected area 401 is permitted using information described in the certificate. This determination process is performed for each of the segment areas (areas #0, #1, #2, and the like shown in FIG. 6) in the protected area 401 shown in FIG. 6, and only a permitted process is executed in a permitted segment area.

The medium read/write restriction information (PAD Read/PAD Write) is set, for example, for each accessing device such as, for example, a content server or a recording and reproducing device (host). This information is recorded in a server certificate (Server Cert) corresponding to each device or a host certificate (Host Cert).

The memory card 400 verifies data recorded in the server certificate (Server Cert) and the host certificate (Host Cert) in accordance with the predetermined program stored in advance in the memory card 400 and permits access only to an area in which access permission is set.

The server access permission information corresponds to the (6) medium read/write restriction information (PAD Read/PAD Write) shown in FIG. 5.

In the (6) medium read/write restriction information (PAD Read/PAD Write) shown in FIG. 5, the following information is recorded, for example.

Access permission information is recorded for each segment area so that only reading of data is permitted for an area (#1) in the protected area 401 shown in FIG. 6; both reading and writing of data are permitted for an area (#2); and neither reading nor writing of data is permitted for an area (#3).

The data processing unit of the memory card 400 determines the accessibility to the respective segment areas using this information. In addition, as a preliminary process of the accessibility determination, cross-authentication is executed between the access requesting device and the memory card 400. The certificate, for example, the server certificate (Server Cert) received from the access requesting device is verified only when this cross-authentication is successful, and the accessible area is determined.

As shown in FIG. 5, in the server certificate (Server Cert), in addition to the above-described data, "(7) Other Information" is also recorded. In addition, the (8) signature generated with the private key of the authentication station is recorded for each of the data (1) to (7). With this signature, an anti-falsification system is realized.

In the case of using the server certificate (Server Cert), signature verification is first executed so as to check the validity of the server certificate (Server Cert) before using the certificate. In addition, signature verification is executed using the public key of the authentication station.

[3. Token Provided by Server as Content Management Information]

First, as described above with reference to FIG. 3, when executing the process of providing content to the memory card 400, the content server 200 encrypts and provides the content 202 as encrypted content as well as the token 201 used as content management information, the server revocation list (SRL) 203, the content revocation list (CRL) 204, and the encryption key (binding key) and the like to be used for decoding the content, which is not shown in the drawing, to the content recorder (host) 300 and records them on the memory card 400 together with the content.

In addition, when the user loads the disc 250 into the content recorder (host) 300 and records (copies) the content stored in the disc 250 on the memory card 400, the content recorder (host) 300 obtains permission to copy from the content server 200 and executes copying of content. To realize this process, the content recorder (host) 300 acquires a content ID, which is an identifier of content to be copied, from the disc 250 and transmits the content ID to the content server 200.

The content stored in the disc 250 is also encrypted content. In addition to keys used for decoding the content, the token 201 as content management information shown in FIG. 3, the server revocation list (SRL) 203, the content revocation list (CRL) 204, and the like are provided from the content server 200 to the content recorder (host) 300. These data are recorded on the memory card 400 together with the content as the management data corresponding to the content provided from the disc 250.

A specific example of a data configuration of the token 201 generated and provided by the content server 200 will be described with reference to FIG. 7.

As shown in FIG. 7, the token has the following data as recording data:

(1) minimum allowable content revocation list (CRL) version (Minimum CRL Version);

(2) minimum allowable server revocation list (SRL) version (Minimum SRL Version);

(3) volume ID (PV Volume ID);

(4) content ID;

(5) content hash table digest(s);

(6) use control information hash (Usage Rule Hash);

(7) time stamp;

(8) other information; and (9) signature.

Hereinafter, the respective data (1) to (9) will be described.

(1) Minimum allowable content revocation list (CRL) version (Minimum CRL Version)

(2) Minimum allowable server revocation list (SRL) version (Minimum SRL Version)

These data are the same data as the data stored in the server certificate described above with reference to FIG. 5.

That is, the data are areas in which the minimum version numbers of the content revocation list (CRL) and the server revocation list (SRL), which a reproducing device is permitted to use when verifying the validity of content and servers are recorded. The verifying process is executed as a preliminary process of the content reproducing process.

The reproducing device can acquire these values by referencing the token and verify the revocation of the content and servers using the revocation list (CRL/SRL) only when the versions of the content revocation list (CRL) and the server revocation list (SRL) stored in the memory of the reproducing device are equal to or greater than the minimum values recorded in the token. The content reproducing process is inhibited when the reproducing device maintains only the CRL/SRL of an old version lower than the minimum values recorded in the token.

A detailed sequence of the content reproducing process will be described later with reference to a flowchart.

(3) Volume ID (PV Volume ID)

The volume ID (PV Volume ID) is an identifier (ID) corresponding to content of predetermined units (for example, in title units). This ID is data which is often referenced by a BD-J/API, BD+API, or the like which is a Java™ application that is likely to be used when reproducing content, for example.

(4) Content ID

Although the content ID is an identifier for identifying content, the content ID recorded in the token is set as data including a server ID of a server that provides content or content management data (including a token).

That is, Content ID=Server ID+Unique Content ID.

As described above, the content ID is recorded as data including the server ID.

The server ID is an ID which the authentication station sets to each content server. The server ID is the same ID as the server ID which is recorded in the server certificate (Server Cert) described above with reference to FIG. 5.

The unique content ID is an identifier (ID) corresponding to content, which is uniquely set by the content server.

The content ID recorded in the token includes a combination of the server ID set by the authentication station and the unique content ID set by the content server as described above.

The respective numbers of bits of the content ID, the server ID, and the unique content ID are determined in advance. The reproducing device that reproduces content can acquire the server ID by acquiring a predetermined number of upper bits from the content ID recorded in the token and acquire the unique content ID by acquiring a predetermined number of lower bits from the content ID.

(5) Content Hash Table Digest(s)

The content hash table digest(s) is data in which the hash value of content is stored in the memory card. The data is used for verifying falsification of content.

The reproducing device that reproduces content calculates the hash value of content which is to be reproduced and has been recorded in the memory card and compares the hash value with the value recorded in the content hash table digest(s) which is recorded in the token. If the calculated data is identical to the registered data, it is determined that the content is not falsified, and the content can be reproduced. If they are not identical, it is determined that there is a possibility that the content is falsified, and reproduction thereof is inhibited.

(6) Use Control Information Hash (Usage Rule Hash)

The use control information hash (Usage Rule Hash) is the hash value of the use control information which a server provided to users as management data of content so as to be recorded in the memory card.

The use control information is data in which information on permission of a content use type is recorded. Examples of the information include the permissibility of copying content, the allowable number of copies, and the availability to output content to other devices. The use control information is information recorded in the memory card together with content.

The use control information hash is the hash value used as data for verifying falsification of the use control information.

The reproducing device that reproduces content calculates the hash value of use control information corresponding to content which is to be reproduced and has been recorded in the memory card and compares the hash value with the value recorded in the use control information hash (Usage Rule Hash) which is recorded in the token. If the calculated data is identical to the registered data, it is determined that the use control information is not falsified, and the content can be used in accordance with the use control information. If they are not identical, it is determined that there is a possibility that the use control information is falsified, and the use of content such as reproduction is inhibited.

(7) Time Stamp

The time stamp is information indicating the date when the token is created, for example, the date when the (9) signature in FIG. 7 is created.

As shown in FIG. 7, in the token, in addition to the above-described data, "(8) Other Information" is also recorded. In addition, the (9) signature generated with the private key of the server is recorded for each of the data (1) to (8). With this signature, an anti-falsification system of the token is realized.

In the case of using the token, signature verification is first executed so as to check the validity of the token before using the token. In addition, signature verification is executed using the public key of the server. The public key of the server can be acquired from the server certificate described above with reference to FIG. 5.

[4. Processes Between Server and Memory Card and Data Stored in Memory Card]

Next, the processes between the server and the memory card and the data stored in the memory card will be described with reference to FIGS. 8A to 8C and its subsequent drawings.

In FIGS. 8A to 8C, (A) content server, (B) content recorder (host), and (C) memory card are shown from left to right.

The (A) content server corresponds to the content server 200 shown in FIG. 3, the (B) content recorder corresponds to the content recorder (host) 300 shown in FIG. 3, and the (C) memory card corresponds to the memory card 400 shown in FIG. 3.

FIGS. 8A to 8C show a process sequence when the content server provides content and content management information other than the content to the memory card so as to be recorded in the memory card.

When content is copied from the disc 250 shown in FIG. 3 and recorded on the memory card, although the content is recorded from the disc to the memory card, the other management data including a token are transmitted from the content server to the memory card and recorded on the memory card.

In addition, the (C) memory card shown in FIG. 8C is loaded into the (B) content recorder (host), communicates with the (A) content server through a communication unit of the (B) content recorder (host), receives various types of data from the (A) content server through the (B) content recorder (host), and records the data on the (C) memory card.

The process sequence will be described with reference to FIGS. 8A to 8C.

First, in step S21, a cross-authentication process is performed between the content server and the memory card. For example, a cross-authentication process including exchanging of mutual public key certificates is performed in accordance with a public key encryption method. As described above, the content server maintains the server certificate in which the public key issued by the authentication station is stored and the private key. The memory card has also received the public key certificate and private key pair from the authentication station and recorded them in its memory.

In addition, the memory card stores a program for performing the cross-authentication process and a program for determining the accessibility to the protected area described with reference to FIG. 6 and has a data processing unit for executing these programs.

If the cross-authentication between the content server and the memory card is successful and the mutual validity is verified, the server provides various types of data to the memory card. If the cross-authentication is not successful, the server does not provide data.

When the cross-authentication is successful, the content server acquires data such as a volume ID recorded in a database 211 to generate a token 213. In step S22, the content server signs the token and transmits the token to the content recorder (host) as data to be written to the memory card.

The token 213 includes the following data as described above with reference to FIG. 7:

(1) minimum allowable content revocation list (CRL) version (Minimum CRL Version);
(2) minimum allowable server revocation list (SRL) version (Minimum SRL Version);
((3)) volume ID (PV Volume ID);
(4) content ID;
(5) content hash table digest(s);
(6) use control information hash (Usage Rule Hash);
(7) time stamp;
(8) other information; and
(9) signature.

The token including these data is transmitted from the (A) content server to the (C) memory card through the (B) content recorder (host) and recorded on the memory card. The recording data is a token 415 shown in the (C) memory card of FIG. 8C.

In addition, the memory card is segmented into a protected area and a nonprotected area (User Area) as described above with reference to FIG. 6.

A protected area 412 is shown in the (C) memory card shown in FIG. 8C. In the protected area 412, a binding key (Kb) 414 is recorded in the protected area 412 as shown in FIG. 8C. The other data are recorded in the nonprotected area (User Area).

In addition, the binding key (Kb) 414 is a key used for encrypting a title key (also called a CPS unit key) which is used for decoding encrypted content, and is generated by the content server generating random numbers or the like.

In step S23 of the (A) content server in FIG. 8A, the binding key (Kb) is generated by the content server. This key is sequentially generated by the server generating random numbers or the like whenever content is provided to the memory card or content is copied from the disc, and the generated key is provided to the memory card. Therefore, different binding keys are generated whenever content is provided or copied.

The binding key (Kb) generated by the server is written to the protected area of the memory card.

In addition, as described above with reference to FIG. 6, the process of writing data to the protected area of the memory card or the process of reading data from the protected area is a restricted process. The availability of writing or reading is set for each access requesting device (a server or a recording and reproducing device (host)) and for each segment area (#1, #2, and the like). This setting information is recorded in the server certificate (Server Cert) of the server and in the host certificate (Host Cert) of the recording and reproducing device (host).

The memory card records the binding key (Kb) in the segment area in the protected area, in which writing is permitted, by referencing the certificate (in this example, the server certificate (Server Cert)) received from the access requesting device. This binding key is the binding key (Kb) 414 shown in FIG. 8C. Although the detailed internal configuration of the protected area 412 is not shown in FIG. 8C, the protected area is segmented into a plurality of segment areas (#0, #1, #2, and the like) as described above with reference to FIG. 6, and the binding key (Kb) 414 is recorded in the segment area which is recorded in the server certificate as a writable area.

The server certificate (Server Cert) can be referenced from the certificate which the memory card has received from the content server during the authentication process in step S21. In this case, it is to be ensured that the signature of the authentication station is set in the server certificate (Server Cert), the memory card executes signature verification using the public key of the authentication station, and the validity of the server certificate (Server Cert) is verified.

In addition, when transmitting the binding key from the content server to the memory card, the binding key is transmitted as data encrypted with a session key.

The session key is a key which is generated during the cross-authentication process (step S21) between the server and the memory card and shared by them. The memory card decodes the encrypted binding key with the session key and records the binding key in a predetermined segment area in the protected area of the memory card.

Subsequently, in step S24, the (A) content server shown in FIG. 8A performs a key generation process (AES-G) using the generated binding key (Kb) and a medium ID received from the (C) memory card. The key generated in this step is called a volume unique key.

The medium ID is an ID which is recorded in advance in the internal memory of the memory card as identification information of the memory card.

Subsequently, in step S25, the content server encrypts a title key (CPS unit key) 215 which is an encryption key of content using the volume unique key to thereby generate an encrypted title key.

The (A) content server transmits the generated encrypted title key to the (C) memory card through the (B) content recorder (host). The memory card records the received encrypted title key on the memory card. The recording data is the encrypted title key 416 shown in the (C) memory card of FIG. 8C. In addition, the title key is also called a CPS unit key.

Furthermore, the content server generates use control information 216 corresponding to the content, executes a signing process using the private key of the content server in step S27, and provides the use control information 216 to the memory card.

Moreover, in step S28, the content server encrypts the content 218 using the title key 215 and provides the content 218 to the memory card.

The memory card records these data provided from the server. The recording data is use control information 417 and encrypted content 418 shown in the (C) memory card of FIG. 8C.

Although not shown in the process sequence of FIGS. 8A to 8C, in addition to these data, the content server provides the following data to the memory card:

(1) content revocation list (CRL); and
(2) server revocation list (SRL).

The memory card records these data on the memory card.

FIG. 9 shows a directory structure showing the data recorded in the memory card and an example of data recorded in the reproducing device that executes a content reproducing process.

The directory structure of the memory card is shown on the left side of FIG. 9.

The directory structure includes a "root" directory, a "BDMV" directory which is under the "root" directory and in which BD-related content is mainly recorded, and a "DELTA" directory which is under the "BDMV" directory and in which content downloaded from a server or copied from a disc and the management information thereof are recorded. Under the "DELTA" directory, content and content management data provided from the server are recorded.

The directory structure shown in FIG. 9 is an example, and the recording structure of the memory card is not limited to this example, but various other structures may be used. However, it is necessary that content and management information including a token or the like corresponding to the content are recorded so that the correspondence can be identified.

Next, the data recorded under the "DELTA" directory of the memory card shown in FIG. 9 will be described.

A CPS unit key file 421 corresponds to the encrypted title key 416 shown in FIG. 8C.

A token 422 corresponds to the token 415 shown in FIG. 8C.

Although not shown in FIGS. 8A to 8C, a content hash table 423 is provided from the content server as the hash value of content and recorded.

Use control information (CPS Unit Usage File #1 to #n) 424#1 to #n correspond to the use control information 417 shown in FIG. 8C. In addition, the CPS unit is a unit that is set as the use unit (reproduction unit) of content, and the use control information is set for each unit.

A server certificate 425 is the certificate which is received from the server in the authentication process (step S21) shown in FIGS. 8A and 8C and has a configuration in which the server ID, the public key of the server, and the like are stored as described above with reference to FIG. 5.

A content revocation list (CRL) 426 is a list of the identifiers (IDs) of revoked contents and has the data configuration described above with reference to FIG. 4B.

A server revocation list (SRL) 427 is a list of the identifiers (IDs) of revoked servers and has the data configuration described above with reference to FIG. 4A.

In the memory card, such content and content management data are recorded.

Although not shown in the drawing, the binding key is recorded in the protected area of the memory card.

To decode encrypted content, it is necessary to acquire the title key (CPS unit key), and the title key is encrypted using the volume unique key which is generated using the binding key and the medium ID as described above.

Therefore, for the reproducing device to acquire the title key, it is necessary to read the binding key recorded in the protected area of the memory card, generate the volume unique key using the medium ID, and decode the encrypted title key (encrypted CPS unit key) using the generated volume unique key to thereby acquire the title key (CPS unit key).

On the right side of FIG. 9, an example of data recorded in the memory of a reproducing device that reproduces content recorded on the memory card is shown. The reproducing device that executes the content reproducing process is, for example, the recording and reproducing device 22 and the PC 23 shown in FIGS. 1A to 1C and 2, or a reproducing device having only a reproducing function. In the memories of these reproducing devices executing the content reproducing process, a server revocation list (SRL) 311 and a content revocation list (CRL) 312 are recorded.

In the reproducing device executing the content reproducing process, during the content reproducing process, the versions of the server revocation list (SRL) 311 and the content revocation list (CRL) 312 stored in the memory of the reproducing device are compared with the versions of the server revocation list (SRL) and the content revocation list (CRL) which the reproducing device can acquire at that point of time. If it is possible to acquire the list of the newer versions than the versions of the lists stored in the memory of the reproducing device, a list updating process of substituting the lists of the old versions stored in the memory with the lists of the newer versions is performed.

For example, when the reproducing device reproduces content recorded on the memory card, the versions of the server revocation list (SRL) 426 and the content revocation list (CRL) 427 recorded on the memory card are compared with the versions of the server revocation list (SRL) 311 and the content revocation list (CRL) 312 stored in the memory of the reproducing device.

For example, if the versions of the server revocation list (SRL) 426 and the content revocation list (CRL) 427 recorded on the memory card are newer (for example, the versions value greater) than the versions of the server revocation list (SRL) 311 and the content revocation list (CRL) 312 stored in the memory of the reproducing device, the reproducing device substitutes the server revocation list (SRL) 311 and the content revocation list (CRL) 312 stored in the memory of the reproducing device with the server revocation list (SRL) 426 and the content revocation list (CRL) 427 recorded on the memory card.

Furthermore, when reproducing content from a disc, if it is possible to obtain a newer revocation list from the disc, the list stored in the memory is updated with the list read from the disc.

In this way, the reproducing device performs the process of substituting the revocation list with a newer revocation list. The execution sequence of this process is recorded in a part of a reproduction processing program maintained in the reproducing device, for example, and the reproducing device updates the respective revocation lists in accordance with the program.

When a content reproducing program recorded in advance in the reproducing device is executed, the versions of the server revocation list (SRL) 311 and the content revocation list (CRL) 312 recorded in the reproducing device are compared with the versions of the lists which are available at that point of time, for example, the lists received from the server or read from the disc or the like. If it is possible to obtain lists of a newer version, the old lists recorded in the memory of the reproducing device are updated.

[5. Sequence of Process of Downloading Content from Server]

Next, the sequence of process of downloading content from a server will be described with reference to the flowcharts of FIG. 10 and its subsequent drawings.

The flowchart shown in FIG. 10 is, for example, the process of downloading content from the content server 11 shown in FIG. 1A and recording the content on the memory card 31 shown in FIG. 1C.

The flowchart shown in FIG. 10 is the process executed by the data processing unit of the (b) content recorder (the shared terminal 21, the recording and reproducing device 22, the PC 23, or the like) shown in FIG. 1B. However, the process of writing or reading data to/from the memory card may be sometimes executed by the data processing unit of the memory card.

For example, in the process of writing a binding key in step S109, the data processing unit of the memory card determines the availability of writing data to the protected area described in advance with reference to FIG. 6.

The respective steps of the flowchart shown in FIG. 10 will be described.

In step S101, the memory card is loaded into a device, and access to a server is performed. At this point of time, the cross-authentication process between the server and the memory card described above in step S21 of FIGS. 8A and 8C is executed. The processes of step S102 and its subsequent steps are executed when this cross-authentication process succeeds. When the cross-authentication fails, a content downloading process is not executed. In addition, the cross-authentication process may be performed between the recording and reproducing device and the server and between the recording and reproducing device and the memory card as necessary.

Various types of data are provided to the memory card and stored in the memory card at least after the cross-authentication between the server and the memory card has been successful. In addition, communication with the server is performed through a device to which the memory card is loaded, for example, through the (b) content recorder (the shared terminal 21, the recording and reproducing device 22, the PC 23, or the like) shown in FIG. 1B.

In step S102, various types of data such as a token, a content revocation list (CRL), a server revocation list (SRL), and a server certificate are downloaded, read, and written to the memory card.

The token has the data described above with reference to FIG. 7.

The content revocation list (CRL) is the list of identifiers (IDs) of revoked contents described above with reference to FIG. 4B.

The server revocation list (SRL) is the list of identifiers (IDs) of revoked servers described above with reference to FIG. 4A.

The server certificate is the data in which the server public key described above with reference to FIG. 5 is stored.

In addition, the content revocation list (CRL), the server revocation list (SRL), and the server certificate are issued by the authentication station 100 shown in FIG. 3 and are signed with the private key of the authentication station 100.

The token is issued by the server (for example, the content server 200 shown in FIG. 3) and is signed with the private key of the server.

In step S103, the content revocation list (CRL) and the server revocation list (SRL) acquired from the server in step S102 are verified and read into the memory of the reproducing device.

A detailed sequence of step S103 will be described with reference to the flowchart shown in FIG. 11.

Figure 11:
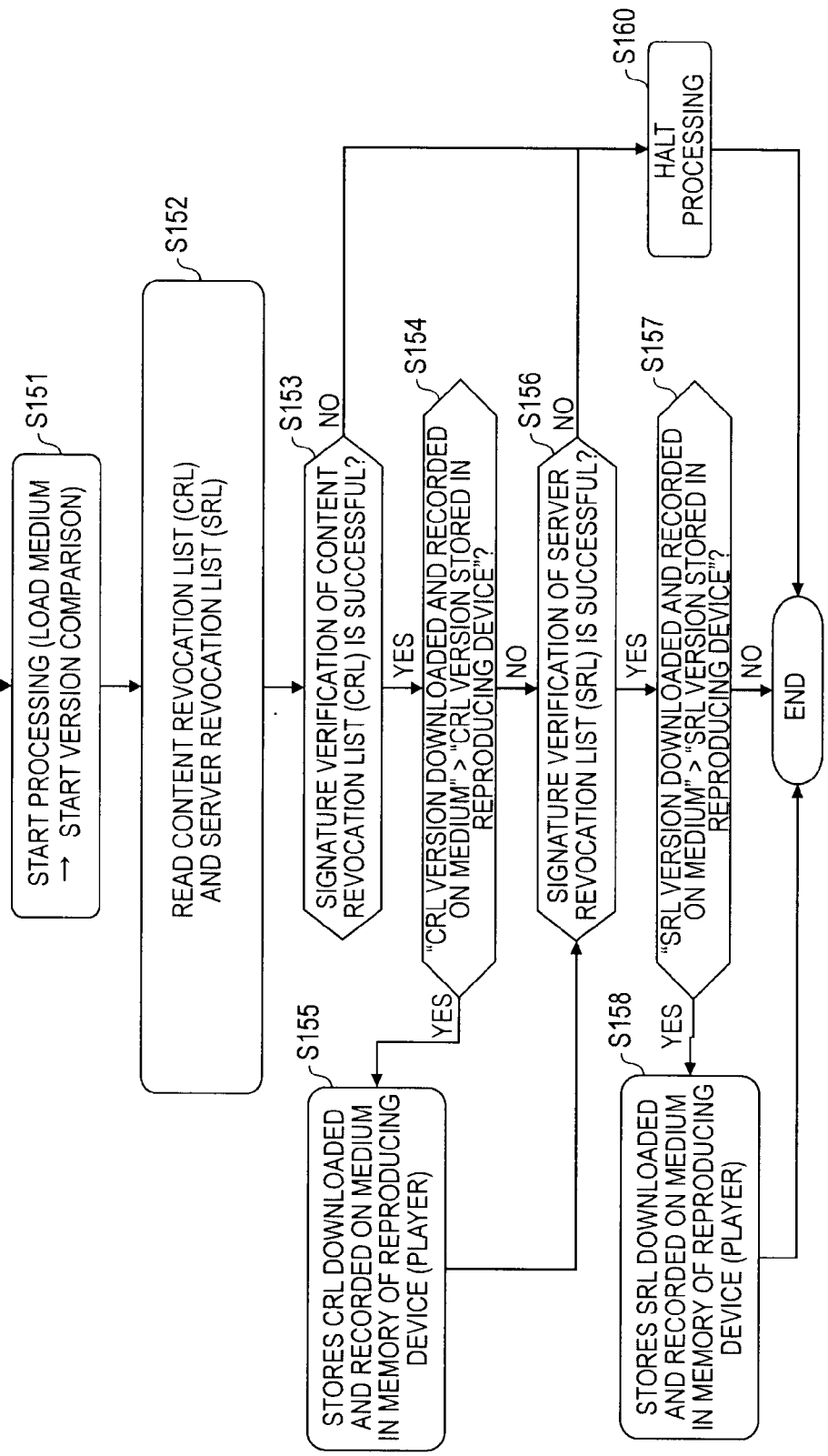
FIG. 11 is a flowchart illustrating a detailed process sequence of step S103 in the flowchart shown in FIG. 10.

The process starts with step S151 of FIG. 11. This process is performed when the processes of steps S101 and S102 of the flowchart shown in FIG. 10 are finished. That is, this process is performed when the memory card is loaded, and the token, the content revocation list (CRL), the server revocation list (SRL), and the server certificate are recorded on the loaded memory card.

In step S152, the content revocation list (CRL) and the server revocation list (SRL) recorded on the memory card are read.

These data are downloaded from the server.

In step S153, the signature of the content revocation list (CRL) is verified.

As described above, the content revocation list (CRL) is the list issued by the authentication station (the authentication server) 100 as described with reference to FIG. 3 and is signed with the private key of the authentication station. In step S153, this signature is verified. In addition, the public key of the authentication station necessary for the signing can be acquired from the public key certificate of the authentication station and is stored in the device (for example, the (b) content recorder (the shared terminal 21, the recording and reproducing device 22, the PC 23, or the like) shown in FIG. 1B) executing this process. If the public key is not stored, it is acquired as necessary.

In step S153, if the signature verification of the content revocation list (CRL) is successful, and it is confirmed that the content revocation list (CRL) is a valid list without falsification, the flow process to step S154.

On the other hand, in step S153, if the signature verification of the content revocation list (CRL) is not successful, and it is not confirmed that the content revocation list (CRL) is a valid list without falsification, the flow process to step S160, and the subsequent processes are halted. In this case, the processes of step S104 and its subsequent steps of the flowchart of FIG. 10 are halted, and downloading (S106) of content is not performed.

In step S153, if the signature verification of the content revocation list (CRL) is successful, and it is confirmed that the content revocation list (CRL) is a valid list without falsification, the flow process to step S154.

In step S154, the version of the content revocation list (CRL) downloaded and recorded on the medium (memory card) is compared with the version of the content revocation list (CRL) stored in the memory of the device, for example, the (b) content recorder (the shared terminal 21, the recording and reproducing device 22, the PC 23, or the like) in FIG. 1B, which is executing this process.

This process corresponds to the process of comparing the versions of two content revocation lists (CRL) described above with reference to FIG. 9, namely (1) the content revocation list (CRL) 427 downloaded from the server and recorded on the memory card and (2) the content revocation list (CRL) 312 stored in the memory of the reproducing device.

The reproducing device corresponds to the device (for example, the (b) content recorder (the shared terminal 21, the recording and reproducing device 22, the PC 23, or the like) shown in FIG. 1B), which is executing the downloading process.

In step S154, if "the version number of the content revocation list (CRL) downloaded and recorded on the medium (memory card)" is greater than "the version number of the content revocation list (CRL) recorded in the memory of the reproducing device," the flow proceeds to step S155.

If the above relation is satisfied, it means that the content revocation list (CRL) downloaded and recorded on the medium (memory card) is newer than the content revocation list (CRL) recorded in the memory of the reproducing device (for example, the (b) content recorder (the shared terminal 21, the recording and reproducing device 22, the PC 23, or the like) shown in FIG. 1B).

In this case, in step S155, an updating process of substituting the old content revocation list (CRL) recorded in the memory of the reproducing device (for example, the (b) content recorder (the shared terminal 21, the recording and reproducing device 22, the PC 23, or the like) shown in FIG. 1B) with the new content revocation list (CRL) downloaded and recorded on the medium (memory card).

Since the reproducing device that performs the content reproducing process determines the revocation state of the content and server by referencing the revocation list stored in the memory of the reproducing device during the content reproducing process, by performing such an updating process, it is possible to perform appropriate determination using a newer list. The sequence of the content reproducing process will be described later.

When the process of updating the content revocation list (CRL) in step S155 is finished, and it is determined in step S154 that the content revocation list (CRL) downloaded and recorded on the medium (memory card) is not newer than the content revocation list (CRL) recorded on the memory of the device (No in step S154), the flow proceeds to step S156.

In step S156, the signature of the server revocation list (SRL) is verified.

As described above, the server revocation list (SRL) is the list issued by the authentication station (the authentication server) 100 as described with reference to FIG. 3 and is signed with the private key of the authentication station. In step S156, this signature is verified. In addition, the public key of the authentication station necessary for the signing can be acquired from the public key certificate of the authentication station and is stored in the device (for example, the (b) content recorder (the shared terminal 21, the recording and reproducing device 22, the PC 23, or the like) shown in FIG. 1B) executing this process. If the public key is not stored, it is acquired as necessary.

In step S156, if the signature verification of the server revocation list (SRL) is successful, and it is confirmed that the server revocation list (SRL) is a valid list without falsification, the flow process to step S157.

On the other hand, in step S156, if the signature verification of the server revocation list (SRL) is not successful, and it is not confirmed that the server revocation list (SRL) is a valid list without falsification, the flow process to step S160, and the subsequent processes are halted. In this case, the processes of step S104 and its subsequent steps of the flowchart of FIG. 10 are halted, and downloading (S106) of content is not performed.

In step S156, if the signature verification of the server revocation list (SRL) is successful, and it is confirmed that the server revocation list (SRL) is a valid list without falsification, the flow process to step S157. In step S157, the version of the server revocation list (SRL) downloaded and recorded on the medium (memory card) is compared with the version of the server revocation list (SRL) stored in the memory of the device, for example, the (b) content recorder (the shared terminal 21, the recording and reproducing device 22, the PC 23, or the like) in FIG. 1B, which is executing this process.

This process corresponds to the process of comparing the versions of two server revocation lists (SRL) described above with reference to FIG. 9, namely (1) the server revocation list (SRL) 426 downloaded from the server and recorded on the memory card and (2) the server revocation list (SRL) 311 stored in the memory of the reproducing device.

The reproducing device corresponds to the device (for example, the (b) content recorder (the shared terminal 21, the recording and reproducing device 22, the PC 23, or the like) shown in FIG. 1B), which is executing the downloading process.

In step S157, if "the version number of the server revocation list (SRL) downloaded and recorded on the medium (memory card)" is greater than "the version number of the server revocation list (SRL) recorded in the memory of the reproducing device," the flow proceeds to step S158.

If the above relation is satisfied, it means that the server revocation list (SRL) downloaded and recorded on the medium (memory card) is newer than the server revocation list (SRL) recorded in the memory of the reproducing device (for example, the (b) content recorder (the shared terminal 21, the recording and reproducing device 22, the PC 23, or the like) shown in FIG. 1B).

In this case, in step S158, an updating process of substituting the old server revocation list (SRL) recorded in the memory of the reproducing device (for example, the (b) content recorder (the shared terminal 21, the recording and reproducing device 22, the PC 23, or the like) shown in FIG. 1B) with the new server revocation list (SRL) downloaded and recorded on the medium (memory card).

As described above, since the reproducing device determines the revocation state of the content and server by referencing the revocation list stored in the memory of the reproducing device during the content reproducing process, by performing such an updating process, it is possible to perform appropriate determination using a newer list. The sequence of the content reproducing process will be described later.

When the process of updating the server revocation list (SRL) in step S158 is finished, and it is determined in step S157 that the server revocation list (SRL) downloaded and recorded on the medium (memory card) is not newer than the server revocation list (SRL) recorded on the memory of the device (No in step S157), this process ends and the flow proceeds to step S204 of the flowchart of FIG. 10.

Returning to the flowchart shown in FIG. 10, the processes of step S104 and its subsequent steps will be described.

In step S104, the following determination processes are performed: (1) Whether content to be downloaded is revoked; and (2) Whether the minimum allowable content revocation list (CRL) version (Minimum CRL Version) recorded in the token is greater than the version of the content revocation list (CRL) stored in the memory of the device executing this process.

The respective determination processes will be described.
(1) Whether Content to be Downloaded is Revoked This determination process is performed by determining whether the content ID of content to be downloaded is recorded in the content revocation list (CRL) stored in the memory of the device. In addition, the content ID may be the content ID which is received from the server in response to a download request to the server and may be the unique content ID in the content ID recorded in the token. Alternatively, a content certificate in which the content ID is recorded may be received additionally from the server and the content ID described in the certificate may be used.

When the content ID of the content to be downloaded is recorded in the content revocation list (CRL) stored in the memory of the device, the content is revoked content, and the determination in step S104 results in "Yes," and the subsequent processes are not executed. The flow proceeds to step S110, and other downloading processes are halted. In this case, the downloading (S106) of content is not executed.

Moreover, in the other determination in step S104 as to (2) whether the minimum allowable content revocation list (CRL) version (Minimum CRL Version) recorded in the token is greater than the version of the content revocation list (CRL) stored in the memory of the device executing this process, if the minimum allowable content revocation list (CRL) version is determined to be greater, it is not possible to use the content revocation list (CRL) stored in the memory of the device. In this case, the determination in step S104 results in "Yes," and the subsequent processes are not executed. The flow proceeds to step S110, and other downloading processes are halted. In this case, the downloading (S106) of content is not executed.

In step S104, only when it is determined that (1) the content to be downloaded is not revoked, and (2) the minimum allowable content revocation list (CRL) version (Minimum CRL Version) recorded in the token is not greater than the version of the content revocation list (CRL) stored in the memory of the device executing this process, the determination in step S104 results in "No," and the flow proceeds to the next step S105.

In step S105, the following determination processes are performed:

(1) whether the server in which the downloading process is performed is revoked; and (2) whether the minimum allowable server revocation list (SRL) version (Minimum SRL Version) recorded in the token is greater than the version of the server revocation list (SRL) stored in the memory of the device executing this process.

The respective determination processes will be described.

(1) Whether the Server in which the Downloading Process is Performed is Revoked

This determination process is performed by determining whether the server ID of the server in which the downloading process is performed is recorded in the server revocation list (SRL) stored in the memory of the device. In addition, the server ID can be acquired from the server certificate acquired in step S102, for example. In addition, as a premise of this process, the validity of the server certificate is verified through verification of the certificate of the authentication station assigned to the server certificate.

When the server ID of the server in which the downloading process is performed is recorded in the server revocation list (SRL) stored in the memory of the device, the server is a revoked server, and the determination in step S105 results in "Yes," and the subsequent processes are not executed. The flow proceeds to step S110, and other downloading processes are halted. In this case, the downloading (S106) of content is not executed.

Moreover, in the other determination in step S105 as to (2) whether the minimum allowable server revocation list (SRL) version (Minimum SRL Version) recorded in the token is greater than the version of the server revocation list (SRL) stored in the memory of the device executing this process, if the minimum allowable server revocation list (SRL) version is determined to be greater, it is not possible to use the server revocation list (SRL) stored in the memory of the device. In this case, the determination in step S105 results in "Yes," and the subsequent processes are not executed. The flow proceeds to step S110, and other downloading processes are halted. In this case, the downloading (S106) of content is not executed.

In step S105, only when it is determined that (1) the server in which the downloading process is performed is not revoked, and (2) the minimum allowable server revocation list (SRL) version (Minimum SRL Version) recorded in the token is not greater than the version of the server revocation list (SRL) stored in the memory of the device executing this process, the determination in step S105 results in "No," and the flow proceeds to the next step S106.

In step S106, the encrypted content, the CPS unit key file, the content hash table, and the use control information (CPS Unit Usage File) are downloaded from the connected server and written to the medium (memory card).

The encrypted content is content which is encrypted with the CPS unit key (title key) included in the CPS unit key file.

The CPS unit key file is a file in which the CPS unit key (title key) which is a content decoding key is recorded. In addition, as described above with reference to FIGS. 8A to 8C, the CPS unit key (title key) itself is also encrypted using the volume unique key which is generated using the binding key and the medium ID.

The content hash table is a table in which the hash value of content is stored. This table is used in order to check the validity of content when reproducing content.

The use control information is data in which restriction information or the like when using content such as a process of reproducing or copying content is recorded.

When the downloading and recording processes in step S106 are finished, a billing process is performed in step S107.

The billing process may be executed as a process that involves connecting to another server such as, for example, a billing server.

If the completion of the billing process is not confirmed in step S108, the process ends in step S110. In this case, since downloading of the binding key in step S109 is not executed, it is not possible to decode and use content.

If the completion of the billing process is confirmed in step S108, the flow proceeds to step S109.

In step S109, the binding key provided from the server is downloaded and recorded on the medium (memory card), and the process ends in step S110.

In addition, the binding key is key data which is necessary when generating the volume unique key through an encryption process which uses the medium ID that is recorded in advance in a nonvolatile memory of the memory card as an identifier of the memory card.

The volume unique key is used for decoding the CPS unit key (title key), and the CPS unit key (title key) is necessary for decoding the encrypted content.

Therefore, if it is not possible to obtain the binding key, the decoding and reproduction of the encrypted content are not possible.

Moreover, the process of writing the binding key to the memory card in step S109 is executed with respect to a predetermined segment area (protected areas #1, #2, #3, and the like shown in FIG. 6) of the protected area of the memory card as described above with reference to FIG. 6.

The recordable area in which the server is permitted to record data in the protected area of the memory card is recorded in the server certificate (Server Cert). The data processing unit of the memory card performs a process of determining a recording destination of the binding key by referencing information recorded in the server certificate (Server Cert) and recording the binding key.

In addition, the device in which the memory card is loaded may receive recording destination permission information acquired by the memory card to determine the recording destination. Moreover, the device itself in which the memory card is loaded may acquire the recordable area information recorded in the server certificate (Server Cert) to determine the recording destination.

Details of the process of controlling the writing/reading of data to/from the protected area of the memory card will be described later.

In the content downloading process with reference to FIG. 10, during the downloading process, it was checked if the version numbers of the content revocation list (CRL) and the server revocation list (SRL) stored in the memory of the reproducing device are equal to or greater than the minimum allowable versions recorded in the token, and the process was halted when the version numbers are lower than the minimum allowable versions recorded in the token.

However, the version checking may not be executed during the downloading process but may be executed during the content reproducing process.

Next, another example of the content downloading process will be described with reference the flowcharts shown in FIGS. 12 and 13.

In the process described with reference to the flowchart of FIG. 10, only the version numbers of the content revocation list (CRL) and the server revocation list (SRL) stored in the memory of the reproducing device were compared with the minimum allowable versions recorded in the token.

Figure 12:
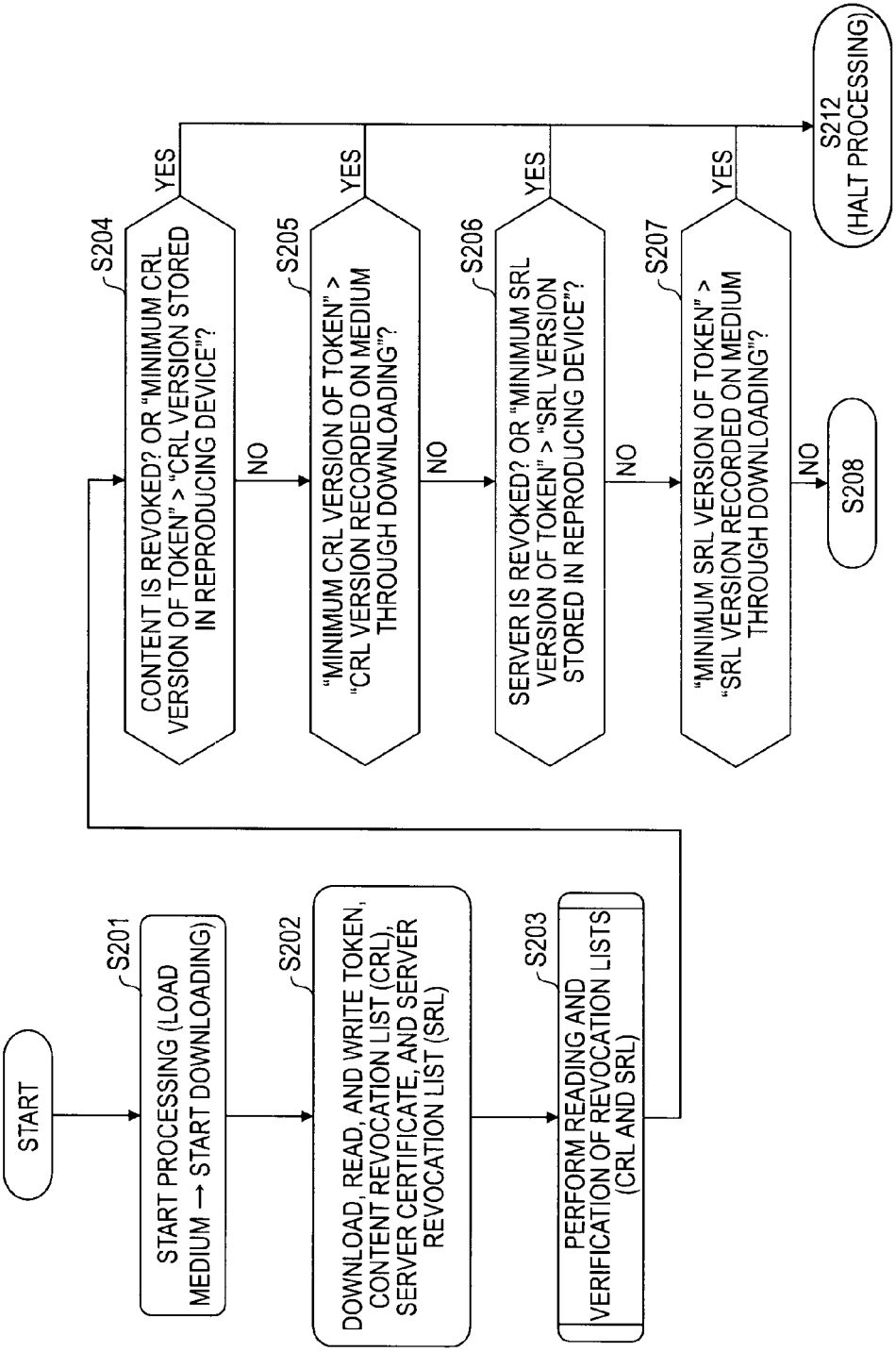
FIG. 12 is a flowchart illustrating a process sequence of downloading content from a content server and recording the content on a memory card.
Figure 13:
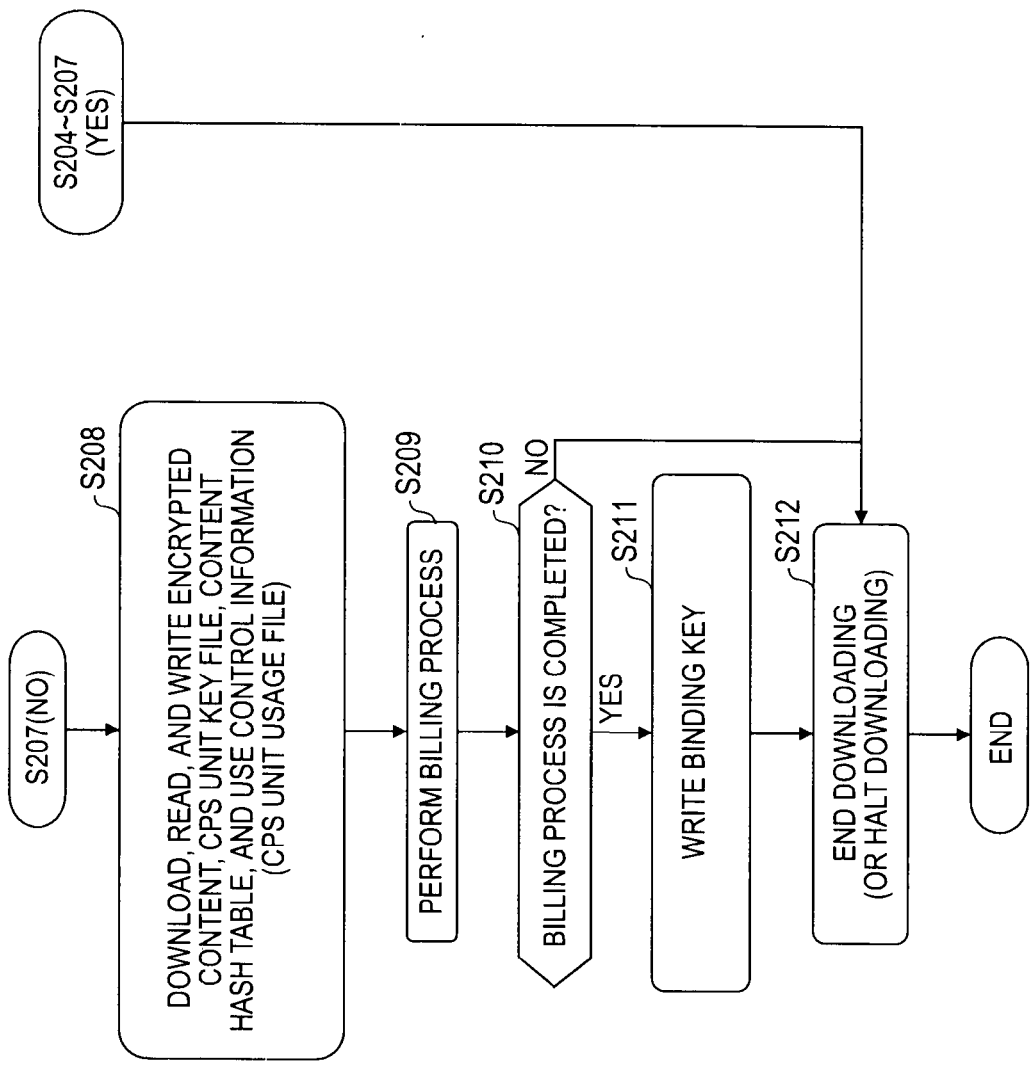
FIG. 13 is a flowchart illustrating a process sequence of downloading content from a content server and recording the content on a memory card.

In the process shown in FIGS. 12 and 13, in addition to the version checking, the version numbers of the content revocation list (CRL) and the server revocation list (SRL) recorded on the medium (memory card) are also compared with the minimum allowable versions recorded in the token.

The process is halted when the version numbers of the content revocation list (CRL) and the server revocation list (SRL) recorded on the medium (memory card) are lower than the minimum allowable versions recorded in the token.

Next, the processes of respective steps of the flowcharts shown in FIGS. 12 and 13 will be described.

The processes of steps S201 to S203 are the same as the processes of steps S101 to S103 described with reference to FIG. 10.

That is, in step S201, the memory card is loaded into a device, and access to a server is performed. When executing step S201, the cross-authentication process between the server and the memory card described above in step S21 of FIGS. 8A and 8C is executed. The processes of step S202 and its subsequent steps are executed when this cross-authentication process is successful.

In step S202, various types of data such as a token, a content revocation list (CRL), a server revocation list (SRL), and a server certificate are downloaded, read, and written to the memory card.

In step S203, the content revocation list (CRL) and the server revocation list (SRL) acquired from the server in step S202 are verified and read into the memory of the reproducing device.

The detailed sequence of step S203 is the same as that described above with reference to the flowchart shown in FIG. 11.

That is, the validity of the content revocation list (CRL) and the server revocation list (SRL) downloaded from the server and recorded on the memory card is verified through signature verification, and the lists stored in the device are updated through comparison of the versions of the downloaded lists and the lists stored in the memory of the recording and reproducing device.

That is, if the downloaded content revocation list (CRL) and server revocation list (SRL) are newer than the respective revocation lists stored in the memory of the device, a revocation list updating process of substituting the lists stored in the memory of the device with the new downloaded lists is executed.

When these processes are completed, the flow proceeds to step S204.

The process of step S204 corresponds to the process of step S104 of the flowchart shown in FIG. 10.

In step S204, the following determination processes are performed: (1) Whether content to be downloaded is revoked; and (2) Whether the minimum allowable content revocation list (CRL) version (Minimum CRL Version) recorded in the token is greater than the version of the content revocation list (CRL) stored in the memory of the device executing this process.

These determination processes are the same as the processes of step S104 of the flowchart shown in FIG. 10.

In step S204, only when it is determined that (1) the content to be downloaded is not revoked, and (2) the minimum allowable content revocation list (CRL) version (Minimum CRL Version) recorded in the token is not greater than the version of the content revocation list (CRL) stored in the memory of the device executing this process, the determination in step S204 results in "No," and the flow proceeds to the next step S205.

In other cases, the determination in step S204 results in "Yes," the flow proceeds to step S212, and the subsequent processes are halted. In this case, the downloading (S208) of content is not executed.

When the determination in step S204 results in "No," the flow proceeds to the next step S205. In step S205, the minimum allowable content revocation list (CRL) version (Minimum CRL Version) recorded in the token is compared with the version of the content revocation list (CRL) which is newly downloaded in step S202 from the server and recorded in the medium (memory card).

The process of step S205 is not included in the process described with reference to FIG. 10.

In step S205, if the minimum allowable content revocation list (CRL) version (Minimum CRL Version) recorded in the token is greater than the version of the content revocation list (CRL) which is newly downloaded in step S202 from the server and recorded on the medium (memory card), the content revocation list (CRL) which is newly recorded through this downloading becomes a list which is not usable in accordance with the contents recorded in the token. In this case, the determination in step S205 results in "Yes," and the subsequent processes are not executed. The flow proceeds to step S212, and other downloading processes are halted. In this case, the downloading (S208) of content is not executed.

In step S205, if it is determined that the minimum allowable content revocation list (CRL) version (Minimum CRL Version) recorded in the token is not greater than the version of the content revocation list (CRL) which is newly downloaded in step S202 from the server and recorded on the medium (memory card), the determination in step S205 results in "No," and the flow proceeds to the next step S206.

The process of step S206 corresponds to the process of step S105 of the flowchart shown in FIG. 10.

In step S206, the following determination processes are performed: (1) Whether the server in which the downloading process is performed is revoked; and (2) Whether the minimum allowable server revocation list (SRL) version (Minimum SRL Version) recorded in the token is greater than the version of the server revocation list (SRL) stored in the memory of the device executing this process.

These determination processes are the same as the processes of step S105 of the flowchart shown in FIG. 10.

In step S206, only when it is determined that (1) the server in which the downloading process is performed is not revoked, and (2) the minimum allowable server revocation list (SRL) version (Minimum SRL Version) recorded in the token is not greater than the version of the server revocation list (SRL) stored in the memory of the device executing this process, the determination in step S206 results in "No," and the flow proceeds to the next step S207.

In other cases, the determination in step S206 results in "Yes," the flow proceeds to step S212, and the subsequent processes are halted. In this case, the downloading (step S208) of content is not executed.

When the determination in step S206 results in "No," the flow proceeds to the next step S207. In step S207, the minimum allowable server revocation list (SRL) version (Minimum SRL Version) recorded in the token is compared with the version of the server revocation list (SRL) which is newly downloaded in step S202 from the server and recorded in the medium (memory card).

The process of step S207 is not included in the process described with reference to FIG. 10.

In step S207, if the minimum allowable server revocation list (SRL) version (Minimum SRL Version) recorded in the token is greater than the version of the server revocation list (SRL) which is newly downloaded in step S202 from the server and recorded on the medium (memory card), the server revocation list (SRL) which is newly recorded through this downloading becomes a list which is not usable in accordance with the contents recorded in the token. In this case, the determination in step S207 results in "Yes," and the subsequent processes are not executed. The flow proceeds to step S212, and other downloading processes are halted. In this case, the downloading (S208) of content is not executed.

In step S207, if it is determined that the minimum allowable server revocation list (SRL) version (Minimum SRL Version) recorded in the token is not greater than the version of the server revocation list (SRL) which is newly downloaded in step S202 from the server and recorded on the medium (memory card), the determination in step S207 results in "No," and the flow proceeds to the next step S208.

The processes of steps S208 to S212 correspond to the processes of steps S106 to S110 of the flowchart shown in FIG. 10.

In step S208, the encrypted content, the CPS unit key file, the content hash table, and the use control information (CPS Unit Usage File) are downloaded from the connected server and written to the medium (memory card).

The encrypted content is content which is encrypted with the CPS unit key (title key) included in the CPS unit key file.

The CPS unit key file is a file in which the CPS unit key (title key) which is a content decoding key is recorded. In addition, as described above with reference to FIGS. 8A to 8C, the CPS unit key (title key) itself is also encrypted using the volume unique key which is generated using the binding key and the medium ID.

The content hash table is a table in which the hash value of content is stored. This table is used in order to check the validity of content when reproducing content.

The use control information is data in which restriction information or the like when using content such as a process of reproducing or copying content is recorded.

When the downloading and recording processes in step S208 are finished, a billing process is performed in step S209.

The billing process may be executed as a process that involves connecting to another server such as, for example, a billing server.

If the completion of the billing process is not confirmed in step S210, the processing is halted in step S212. In this case, since downloading of the binding key in step S211 is not executed, it is not possible to decode and use content.

If the completion of the billing process is confirmed in step S210, the flow proceeds to step S211.

In step S211, the binding key provided from the server is downloaded and recorded on the medium (memory card).

In addition, the binding key is key data which is necessary when generating the volume unique key through an encryption process which uses the medium ID that is recorded in advance in a nonvolatile memory of the memory card as an identifier of the memory card.

The volume unique key is used for decoding the CPS unit key (title key), and the CPS unit key (title key) is necessary for decoding the encrypted content.

Therefore, if it is not possible to obtain the binding key, the decoding and reproduction of the encrypted content are not possible.

Moreover, the process of writing the binding key to the memory card in step S211 is executed with respect to a predetermined segment area (protected areas #1, #2, #3, and the like shown in FIG. 6) of the protected area of the memory card as described above with reference to FIG. 6.

The recordable area in which the server is permitted to record data is recorded in the server certificate (Server Cert). A write processing program of the memory card performs a process of determining a recording destination of the binding key by referencing information recorded in the server certificate (Server Cert) and recording the binding key. Alternatively, a download execution device may perform the process.

Details of the process of controlling the writing/reading of data to/from the protected area of the memory card will be described later.

In the content downloading process with reference to FIG. 12, during the downloading process, it was checked if the version numbers of the content revocation list (CRL) and the server revocation list (SRL) stored in the memory of the reproducing device and the version numbers of the content revocation list (CRL) and the server revocation list (SRL) which are newly downloaded and recorded in the memory card are equal to or greater than the minimum allowable versions recorded in the token, and the process was halted when the version numbers are lower than the minimum allowable versions recorded in the token.

However, the version checking may not be executed during the downloading process but may be executed during the content reproducing process.

Although in the flowcharts shown in FIGS. 10 to 13, content itself was downloaded from the server, when content itself is copied from the disc to the memory card, data other than the content are acquired from the server. In this case, the content downloading process in the flowcharts shown in FIGS. 10 to 13 is substituted with a process of copying content from the disc. The other data such as the content management information including the token, the CRL, the SRL, and the like are downloaded from the server and recorded on the memory card. In this case, the processes other than the content recording shown in the flowcharts of FIGS. 10 to 13 are executed.

[6. Content Reproducing Process Sequence]

Next, the sequence of a content reproducing process of reproducing content which is downloaded from a server and recorded on a medium (memory card) and the management information thereof (management data corresponding to downloaded content) will be described with reference to the flowcharts of FIG. 14 and its subsequent drawings.

The content reproducing process is performed by the reproducing device in which the memory card is loaded. The reproducing device may be various types of devices such as, for example, the recording and reproducing device 22 and the PC 23 shown in FIG. 2, or a reproducing device having only a reproducing function. These reproducing devices store a program for executing the reproducing sequence in accordance with the flowcharts described later and execute various reproducing processes in accordance with the program, such as, for example, decoding of content, verification of management data, or verification of content and server using the management data.

The flowchart shown in FIG. 14 will be described.

In step S301, a medium (memory card) in which reproduction target content and the management data thereof are stored is loaded, and reproduction target content is selected, for example, through designation by a user.

In step S302, the management data corresponding to the reproduction target content are read from the memory card.

The management data include a token, a content hash table, a content revocation list (CRL), a server certificate, and a server revocation list (SRL).

The token has the data described above with reference to FIG. 7.

The content hash table is data in which the hash value of content is stored and is used for determining the validity (falsification) of content.

The content revocation list (CRL) is the list of identifiers (IDs) of revoked contents described above with reference to FIG. 4B.

The server certificate is the data in which the server public key described above with reference to FIG. 5 is stored.

The server revocation list (SRL) is the list of identifiers (IDs) of revoked servers described above with reference to FIG. 4A.

In addition, the content revocation list (CRL), the server revocation list (SRL), and the server certificate are issued by the authentication station 100 shown in FIG. 3 and are signed with the private key of the authentication station 100.

The token and the content hash table are issued by the server (for example, the content server 200 shown in FIG. 3) and are signed with the private key of the server.

In step S303, the revocation state of content is verified based on the content revocation list (CRL) acquired from the server in step S302.

A detailed sequence of step S303 will be described with reference to the flowchart shown in FIG. 15.

Figure 14:
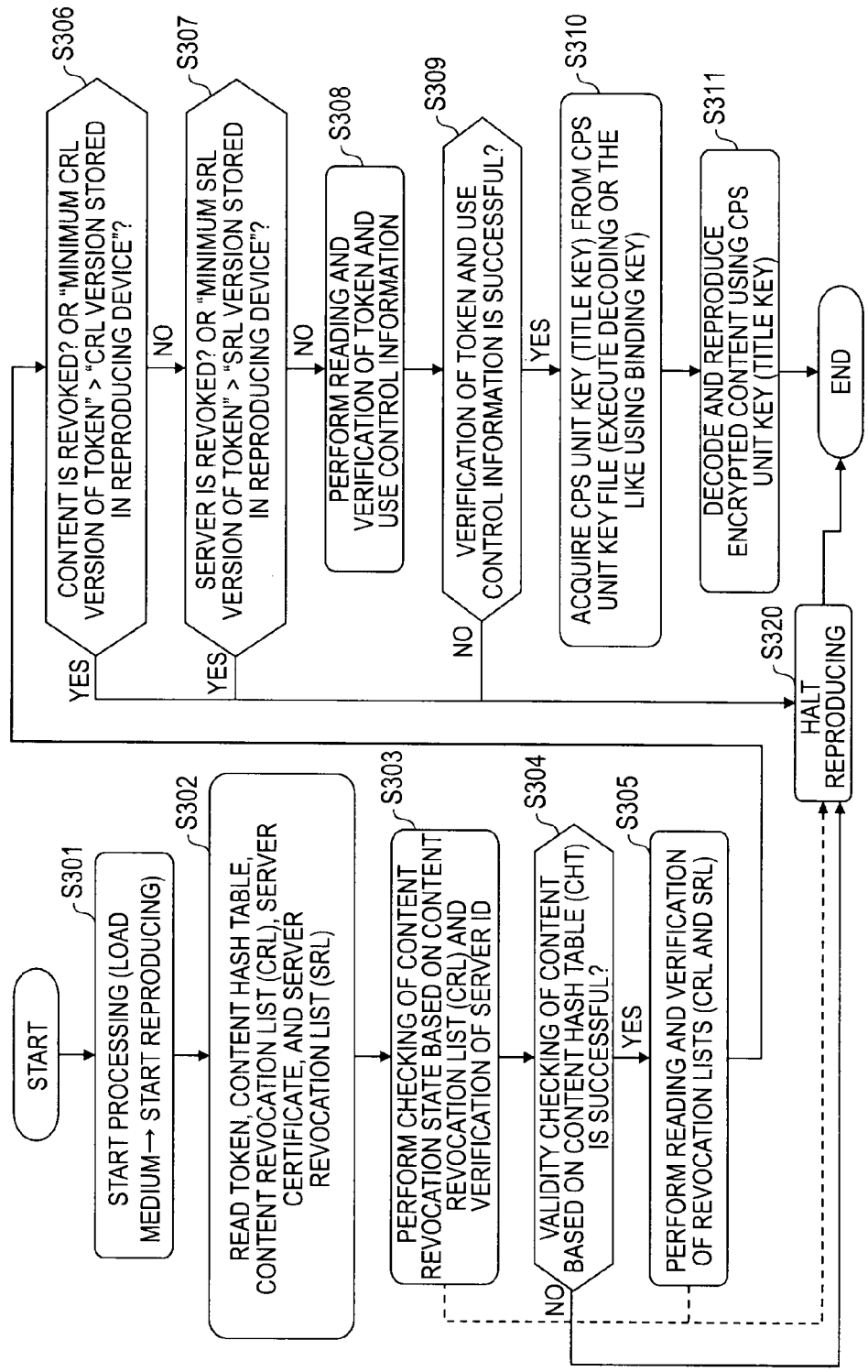
FIG. 14 is a flowchart illustrating a sequence of a content reproducing process of reproducing content which is downloaded from a server and recorded on a medium (memory card) and the management information thereof (management data corresponding to downloaded content).
Figure 15:
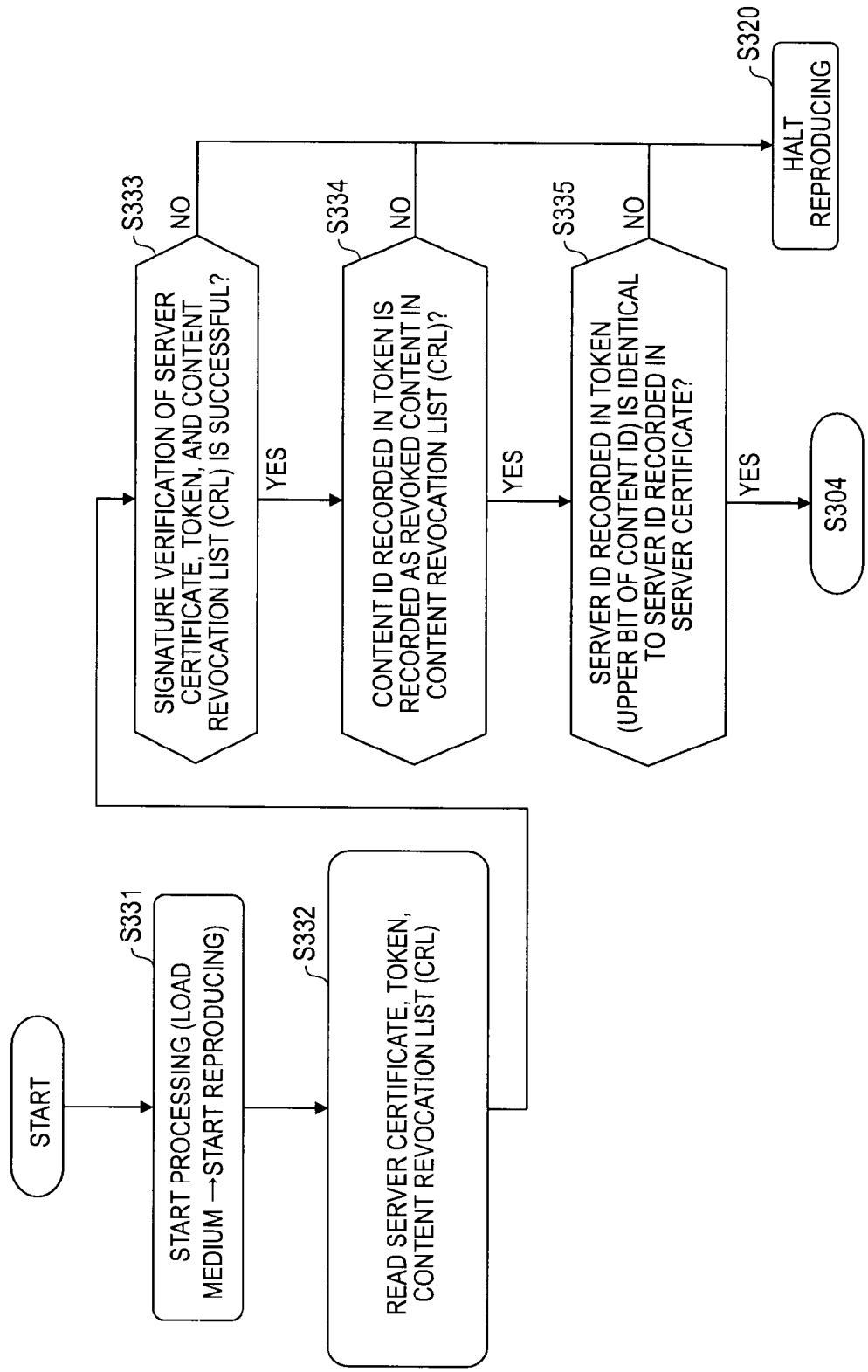
FIG. 15 is a flowchart illustrating a detailed process sequence of step S303 in the flowchart shown in FIG. 14.

The process of step S331 of FIG. 15 is the same as the process of step S301 of FIG. 14 and is a process performed as the commencing condition of the process of verifying the revocation state of content based on the content revocation list (CRL).

In step S332, the data of the server certificate, the token, and the content revocation list (CRL) are obtained.

These data are the management data which are recorded in the memory card so as to correspond to the reproduction target content.

In step S333, the signatures set in the respective data of the server certificate, the token, and the content revocation list (CRL) are verified so as to check the validity of the respective data.

As described above, the content revocation list (CRL), the server revocation list (SRL), and the server certificate are issued by the authentication station 100 shown in FIG. 3 and are signed with the private key of the authentication station. As for these data, signature verification is executed using the public key of the authentication station.

The public key certificate in which the public key of the authentication station is stored in advance is stored in the memory of the reproducing device. Alternatively, the public key certificate is acquired as necessary.

Moreover, the token is issued by the server (for example, the content server 200 shown in FIG. 3) and is signed with the private key of the server. This signature is verified using the public key of the server stored in the server certificate. In this regard, it is to ensure that the validity of the server certificate is verified through signature verification.

In step S333, if all signatures set in the respective data of the server certificate, the token, and the content revocation list (CRL) are verified and determined to be valid, the determination in step S333 results in "Yes," and the flow proceeds to step S334.

On the other hand, if any one of the signatures of the data is determined to be invalid, the determination in step S333 results in "No," the flow proceeds to step S320 (see FIG. 14), and the reproducing process is halted.

In step S333, if the validity of all of the server certificate, the token, and the content revocation list (CRL) is verified, the flow proceeds to step S334. In step S334, it is determined whether the content ID recorded in the verified token is recorded as revoked content in the verified content revocation list (CRL).

In addition, as described above with reference to FIG. 7, in the token, a combination of data of the server ID and the unique content ID are recorded as the content ID.

The content ID recorded in the content revocation list (CRL) may be recorded in a pattern of "unique content ID" or a pattern of "content ID=server ID+unique content ID". Depending on these patterns, the reproducing device compares the content ID (or the unique content ID) recorded in the token with the content ID (or the unique content ID) recorded in the content revocation list (CRL).

If the content ID (or the unique content ID) recorded in the token is recorded in the content revocation list (CRL), the content, namely the reproduction target content is revoked, and the determination in step S334 results in "No," the flow proceeds to step S320, and reproduction of content is halted.

On the other hand, if the content ID (or the unique content ID) recorded in the token is not recorded in the content revocation list (CRL), the content, namely the reproduction target content is not revoked, and the determination in step S334 results in "Yes," and the flow proceeds to step S335.

In step S335, the server ID which is set as the upper bits in the content ID recorded in the token is acquired. It is determined whether this server ID is identical to the server ID recorded in the verified server certificate (Server Cert).

If the two IDs are identical, the token is determined to be a token having correct recording data in which the content ID associated with the server ID of a valid server authenticated by the authentication station is recorded. Thus, the determination in step S335 results in "Yes," and the flow proceeds to step S304 of FIG. 14.

If the two IDs are not identical, the token is determined to be a token having data in which the incorrect content ID associated with a server ID different from the server ID of a valid server authenticated by the authentication station is recorded. Thus, the determination in step S335 results in "No," the flow proceeds to step S320 (FIG. 14), and reproduction of content is halted.

This determination process in step S335 is performed as a process which solves a problem that a token can freely create a server outside the surveillance of the authentication station.

A server authenticated by the authentication station can create an illegal token.

However, as described above with reference to FIG. 7, the content ID recorded in the token has a configuration of Content ID="Server ID"+"Unique content ID," it is possible to identify the server that created the illegal token by referencing the content ID recorded in the token.

In order to make the identifying infeasible, a server that tries to perform an illegal act may create a token by setting the server ID included in the content ID recorded in the token to other server ID or a non-existing server ID rather than its own server ID.

The process of step S335 is to prevent and determine such an illegal act. In step S335, by determining whether the server ID included in the content ID in the token is identical to the server ID recorded in the server certificate, it is determined whether the server ID included in the content ID recorded in the token is the right issuing subject of the token and whether the token is not the token including illegal recording data.

The flow proceeds to step S304 of the flowchart of FIG. 14 when a positive result is obtained in all steps S333, S334, and S335 shown in FIG. 15: that is, whether the signature verification of the server certificate and the content revocation list (CRL) are successful in step S333, whether the content ID recorded in the token is not recorded in the content revocation list (CRL) in step S334, and whether the server ID recorded in the token is identical to the server ID of the server certificate in step S335.

In step S304 of the flowchart of FIG. 14, the validity of the content hash table read in step S302 is verified.

The content hash table (CHT) is a table in which the hash value of content is registered and is data used for verifying the validity (falsification) of content, and is signed with the private key of a server, for example. This signature is verified. The signature verification is executed using the server public key acquired from the server certificate.

In step S304, if the validity of the content hash table (CHT) is not verified, the determination in step S304 results in "No," the flow proceeds to step S320, and reproduction of content is halted.

In step S304, if the validity of the content hash table (CHT) is verified, the determination in step S304 results in "Yes," the flow proceeds to step S305.

In step S305, the content revocation list (CRL) and the server revocation list (SRL) are verified and read into the memory of the reproducing device.

This process corresponds to the process described above with reference to the flowchart shown in FIG. 11.

That is, the validity of the content revocation list (CRL) and the server revocation list (SRL) downloaded from the server and recorded on the memory card is verified through signature verification, and the lists stored in the device are updated through comparison of the versions of the downloaded lists and the lists stored in the memory of the recording and reproducing device.

If the validity is not verified through the signature verification of the revocation list, reproduction of content is halted in step S320.

Moreover, in the version comparison process, if the downloaded content revocation list (CRL) and server revocation list (SRL) are newer than the respective revocation lists stored in the memory of the device, a revocation list updating process of substituting the lists stored in the memory of the device with the new downloaded lists is executed.

When these processes are completed, the flow proceeds to step S306.

In step S306, the following determination processes are performed: (1) Whether reproduction target content is revoked; and (2) Whether the minimum allowable content revocation list (CRL) version (Minimum CRL Version) recorded in the token is greater than the version of the content revocation list (CRL) stored in the memory of the device executing this process.

These determination processes are the same as the processes of step S104 of the flowchart shown in FIG. 10.

In step S306, only when it is determined that (1) the reproduction target content is not revoked, and (2) the minimum allowable content revocation list (CRL) version (Minimum CRL Version) recorded in the token is not greater than the version of the content revocation list (CRL) stored in the memory of the device executing this process, the determination in step S306 results in "No," and the flow proceeds to the next step S307.

In other cases, the determination in step S306 results in "Yes," the flow proceeds to step 320, and the subsequent processes are halted. In this case, the reproduction of content is not executed.

When the determination in step S306 results in "No," the flow proceeds to the next step S307. In step S307, the following determination processes are performed: (1) Whether the server from which the reproduction target content or the management data of the reproduction target content is obtained is revoked; and (2) Whether the minimum allowable server revocation list (SRL) version (Minimum SRL Version) recorded in the token is greater than the version of the server revocation list (SRL) stored in the memory of the device executing this process.

These determination processes are the same as the processes of step S105 of the flowchart shown in FIG. 10.

In step S307, only when it is determined that (1) the server from which the reproduction target content or the management data of the reproduction target content is obtained is not revoked; and (2) the minimum allowable server revocation list (SRL) version (Minimum SRL Version) recorded in the token is not greater than the version of the server revocation list (SRL) stored in the memory of the device executing this process, the determination in step S307 results in "No," and the flow proceeds to the next step S308.

In other cases, the determination in step S307 results in "Yes," the flow proceeds to step S320, and the subsequent processes are halted. In this case, the reproduction of content is not executed.

When the determination in step S307 results in "No," the flow proceeds to the next step S308. In step S308, the token and the use control information are verified.

The token has the data configuration described above with reference to FIG. 7 and is signed with the private key of the server.

The use control information is data in which the content reproduction condition and the content use condition such as the allowable number of copies are recorded and is signed with the private key of the server.

In step S308, the validity of the respective data is verified through verification of the signatures of the respective data. The signature verification is executed using the server public key acquired from the server certificate.

In step S309, the signatures of these respective data are verified so as to check the validity of the data.

In step S309, if the validity of the token and the use control information is not verified, the determination in step S309 results in "No," the flow proceeds to step S320, and the subsequent processes are halted. In this case, reproduction of content is not performed.

In step S309, if the validity of the token and the use control information is verified, the determination in step S309 results in "Yes," and the flow proceeds to the next step S310.

In step S310, the CPS unit key (title key) used for decoding content is acquired.

In addition, as described above with reference to FIGS. 8A to 8C and the like, for the reproducing device to acquire the CPS unit key (title key), the reproducing device reads the binding key recorded in the protected area of the memory card, generates the volume unique key using the medium ID, and decodes the encrypted CPS unit key (encrypted title key) using the generated volume unique key to thereby acquire the CPS unit key (title key).

Thereafter, in step S311, the encrypted content is decoded using the acquired CPS unit key (title key), and the content is reproduced.

As described above, in order to reproduce content, it is necessary to perform a series of processes of verifying the content management data in addition to the token received from the server to check the validity of the respective management data, verifying the validity of the content and the server based on the management data, and acquiring the CPS unit key (title key) for decoding the content using the binding key received from the server to thereby decode the encrypted content.

Moreover, the content revocation list (CRL) and the server revocation list (SRL) used for verifying the validity of the content and the server are limited to those of the versions equal to or greater than the minimum allowable versions recorded in the token. That is, it is inhibited to determine the validity of the content and server using old lists of the versions lower than the minimum allowable versions recorded in the token and to proceed to the reproducing process.

In addition, these reproducing process sequences are executed in accordance with the reproduction processing program maintained by the reproducing device.

Moreover, the process described with reference to FIG. 14 is applied not only to when both the content and the content management data are downloaded from the server but is also executed when content is copied from other medium, for example, the content recording disc shown in FIG. 1A, to the memory card, and the management data corresponding to the content are acquired from the server.

Next, another example of the content reproducing process will be described with reference to the flowcharts of FIGS. 16 and 17.

In the process described with reference to the flowchart of FIG. 14, only the version numbers of the content revocation list (CRL) and the server revocation list (SRL) stored in the memory of the reproducing device were compared with the minimum allowable versions recorded in the token.

Figure 16:
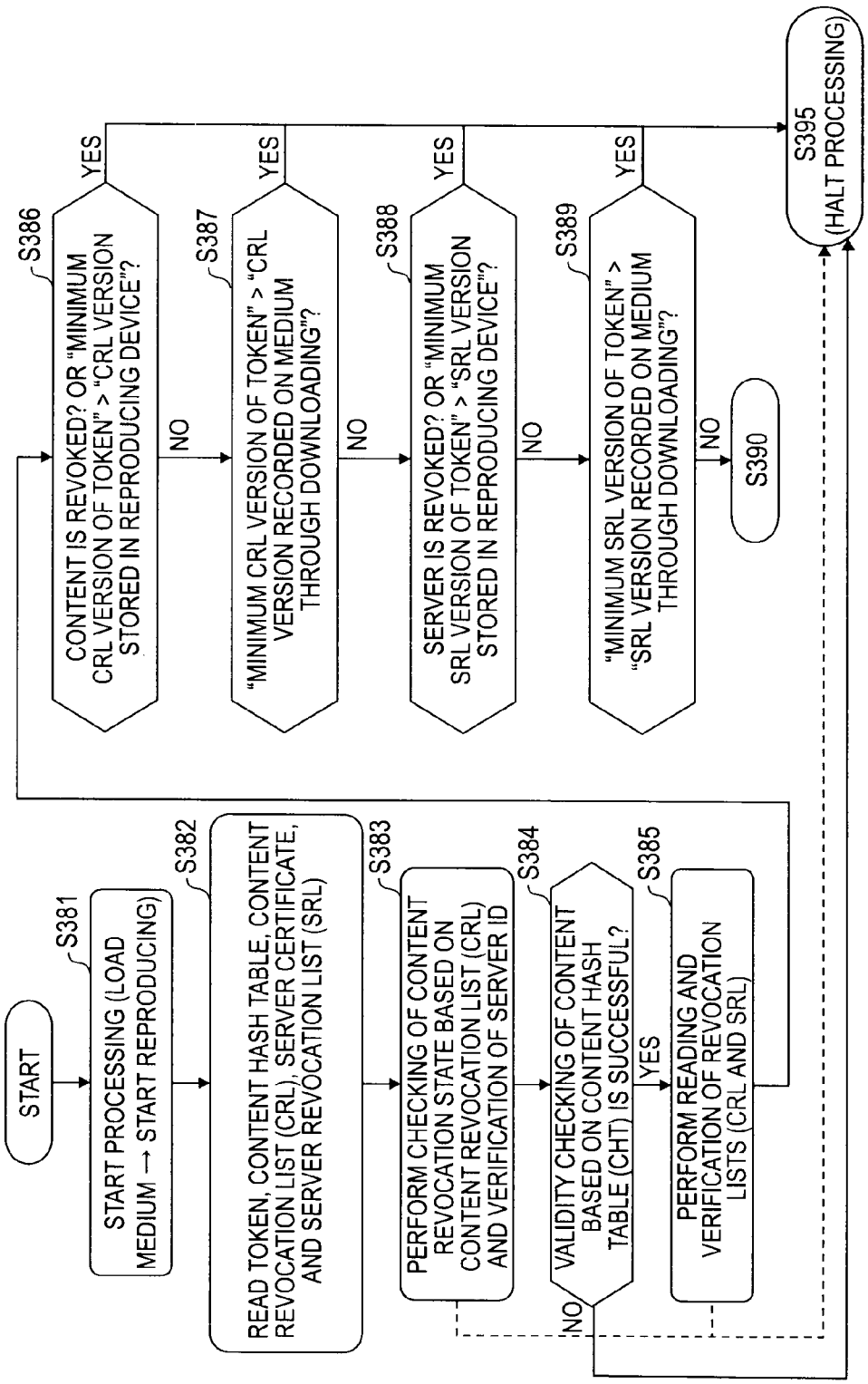
FIG. 16 is a flowchart illustrating a sequence of a content reproducing process of reproducing content which is downloaded from a server and recorded on a medium (memory card) and the management information thereof (management data corresponding to downloaded content).
Figure 17:
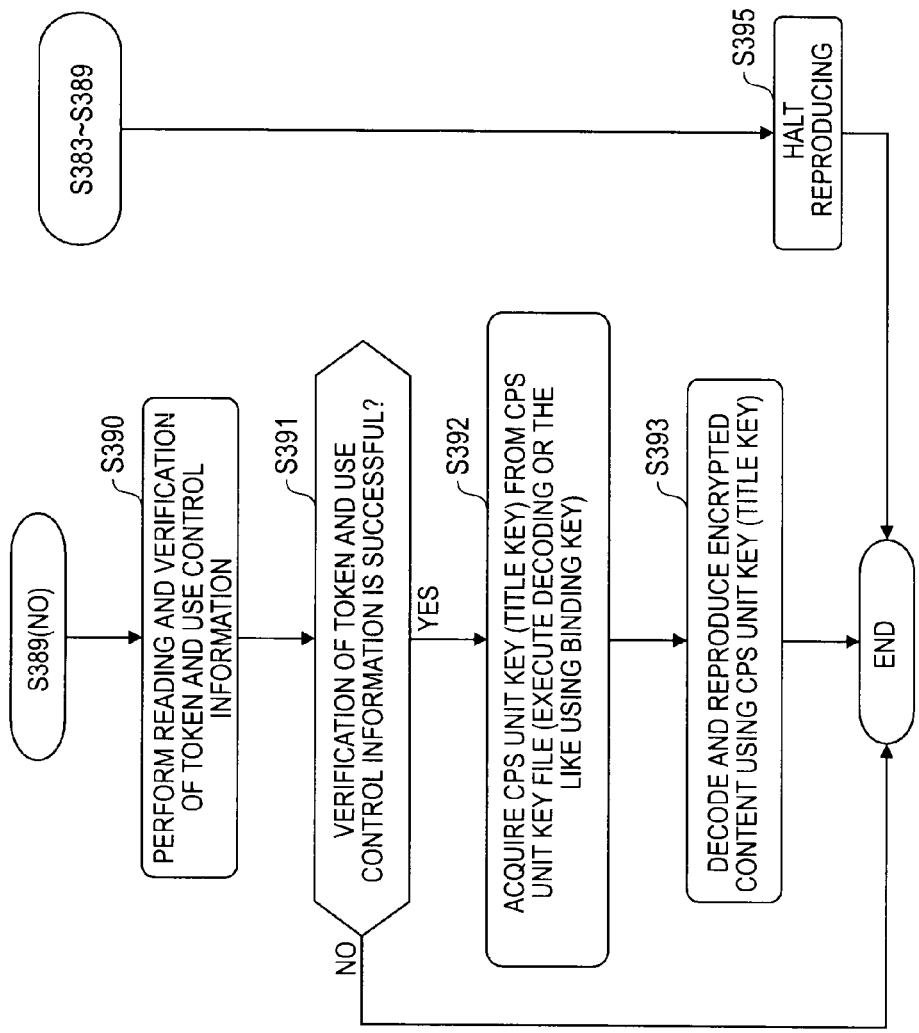
FIG. 17 is a flowchart illustrating a sequence of a content reproducing process of reproducing content which is downloaded from a server and recorded on a medium (memory card) and the management information thereof (management data corresponding to downloaded content).

In the process shown in FIGS. 16 and 17, in addition to the version checking, the version numbers of the content revocation list (CRL) and the server revocation list (SRL) recorded on the medium (memory card) are also compared with the minimum allowable versions recorded in the token.

The reproducing process is halted when the version numbers of the content revocation list (CRL) and the server revocation list (SRL) recorded on the medium (memory card) are lower than the minimum allowable versions recorded in the token.

Next, the processes of respective steps of the flowcharts shown in FIGS. 16 and 17 will be described.

The processes of steps S381 to S385 are the same as the processes of steps S301 to S305 described with reference to FIGS. 14 and 15.

In step S381, a medium (memory card) in which reproduction target content and the management data thereof are stored is loaded, and reproduction target content is selected, for example, through designation by a user.

In step S382, the management data corresponding to the reproduction target content are read from the memory card.

The management data include a token, a content hash table, a content revocation list (CRL), a server certificate, and a server revocation list (SRL).

In step S383, the revocation state of content is verified based on the content revocation list (CRL) acquired from the server in step S382.

A detailed sequence of step S383 is the same as that described above with reference to the flowchart shown in FIG. 15.

The flow proceeds to step S395 when a negative result is obtained in any one of steps S333, S334, and S335 shown in FIG. 15: that is, whether the signature verification of the server certificate and the content revocation list (CRL) are successful in step S333, whether the content ID recorded in the token is not recorded in the content revocation list (CRL) in step S334, and whether the server ID recorded in the token is identical to the server ID of the server certificate in step S335, and the reproduction of content is halted.

The flow proceeds to step S384 of the flowchart of FIG. 16 when a positive results is obtained in all steps S333, S334, and S335.

In step S384 of the flowchart of FIG. 16, the validity of the content hash table read in step S382 is verified.

The content hash table (CHT) is a table in which the hash value of content is registered and is data used for verifying the validity (falsification) of content, and is signed with the private key of a server, for example. This signature is verified. The signature verification is executed using the server public key acquired from the server certificate.

In step S384, if the validity of the content hash table (CHT) is not verified, the determination in step S384 results in "No," the flow proceeds to step S395, and reproduction of content is halted.

In step S384, if the validity of the content hash table (CHT) is verified, the determination in step S384 results in "Yes," the flow proceeds to step S385.

In step S385, the content revocation list (CRL) and the server revocation list (SRL) are verified and read into the memory of the reproducing device.

This process corresponds to the process described above with reference to the flowchart shown in FIG. 11.

That is, the validity of the content revocation list (CRL) and the server revocation list (SRL) downloaded from the server and recorded on the memory card is verified through signature verification, and the lists stored in the device are updated through comparison of the versions of the downloaded lists and the lists stored in the memory of the recording and reproducing device.

If the validity is not verified through the signature verification of the revocation list, reproduction of content is halted (S395).

Moreover, in the version comparison process, if the downloaded content revocation list (CRL) and server revocation list (SRL) are newer than the respective revocation lists stored in the memory of the device, a revocation list updating process of substituting the lists stored in the memory of the device with the new downloaded lists is executed.

When these processes are completed, the flow proceeds to step S386.

In step S386, the following determination processes are performed: (1) Whether the reproduction target content is revoked; and (2) Whether the minimum allowable content revocation list (CRL) version (Minimum CRL Version) recorded in the token is greater than the version of the content revocation list (CRL) stored in the memory of the device executing this process.

These determination processes are the same as the processes of step S306 of the flowchart shown in FIG. 14 and are the same as the processes of step S104 of the flowchart shown in FIG. 10.

In step S386, only when it is determined that (1) the reproduction target content is not revoked, and (2) the minimum allowable content revocation list (CRL) version (Minimum CRL Version) recorded in the token is not greater than the version of the content revocation list (CRL) stored in the memory of the device executing this process, the determination in step S386 results in "No," and the flow proceeds to the next step S387.

In other cases, the determination in step S386 results in "Yes," the flow proceeds to step 395, and the subsequent processes are halted. In this case, the reproduction of content is not executed.

When the determination in step S386 results in "No," the flow proceeds to the next step S387. In step S387, the minimum allowable content revocation list (CRL) version (Minimum CRL Version) recorded in the token is compared with the version of the content revocation list (CRL) which is downloaded from the server as the management data corresponding to the reproduction target content and recorded in the medium (memory card).

The process of step S387 is not included in the process described with reference to FIG. 14.

In step S387, if the minimum allowable content revocation list (CRL) version (Minimum CRL Version) recorded in the token is greater than the version of the content revocation list (CRL) which is downloaded from the server and recorded in the medium (memory card), the content revocation list (CRL) which is newly recorded through this downloading becomes a list which is not usable in accordance with the contents recorded in the token. In this case, the determination in step S387 results in "Yes," and the subsequent processes are not executed. The flow proceeds to step S395, and other processes are halted. In this case, the content reproducing process is not executed.

In step S387, if it is determined that the minimum allowable content revocation list (CRL) version (Minimum CRL Version) recorded in the token is not greater than the version of the content revocation list (CRL) which is downloaded from the server as the management data corresponding to the reproduction target content and recorded in the medium (memory card), the determination in step S387 results in "No," and the flow proceeds to the next step S388.

In step S388, the following determination processes are performed:

(1) whether the server from which the reproduction target content or the content management data corresponding to the reproduction target content are downloaded is revoked; and (2) whether the minimum allowable server revocation list (SRL) version (Minimum SRL Version) recorded in the token is greater than the version of the server revocation list (SRL) stored in the memory of the device executing this process.

These determination processes are the same as the processes of step S307 of the flowchart shown in FIG. 14 and are the same as the processes of step S105 of the flowchart shown in FIG. 10.

In step S388, only when it is determined that (1) the server from which the reproduction target content or the content management data corresponding to the reproduction target content are downloaded is not revoked, and (2) the minimum allowable server revocation list (SRL) version (Minimum SRL Version) recorded in the token is not greater than the version of the server revocation list (SRL) stored in the memory of the device executing this process, the determination in step S388 results in "No," and the flow proceeds to the next step S389.

In other cases, the determination in step S388 results in "Yes," the flow proceeds to step S395, and the subsequent processes are halted. In this case, the reproduction of content is not executed.

When the determination in step S388 results in "No," the flow proceeds to the next step S389. In step S389, the minimum allowable server revocation list (SRL) version (Minimum SRL Version) recorded in the token is compared with the version of the server revocation list (SRL) which is downloaded from the server as the management data corresponding to the reproduction target content and recorded in the medium (memory card).

The process of step S389 is not included in the process described with reference to FIG. 14.

In step S389, if the minimum allowable server revocation list (SRL) version (Minimum SRL Version) recorded in the token is greater than the version of the server revocation list (SRL) which is downloaded from the server and recorded in the medium (memory card), the server revocation list (SRL) which is newly recorded through this downloading becomes a list which is not usable in accordance with the contents recorded in the token. In this case, the determination in step S389 results in "Yes," and the subsequent processes are not executed. The flow proceeds to step S395, and other processes are halted. In this case, the content reproducing process is not executed.

In step S389, if the minimum allowable server revocation list (SRL) version (Minimum SRL Version) recorded in the token is not greater than the version of the server revocation list (SRL) which is downloaded from the server as the management data corresponding to the reproduction target content and recorded in the medium (memory card), the determination in step S389 results in "No," and the flow proceeds to the next step S390.

The processes of steps S390 to S393 correspond to the processes of steps S308 to S311 of the flowchart described with reference to FIG. 14.

In step S390, the token and the use control information are verified.

The token has the data configuration described above with reference to FIG. 7 and is signed with the private key of the server.

The use control information is data in which the content reproduction condition and the content use condition such as the allowable number of copies are recorded and is signed with the private key of the server.

In step S390, the validity of the respective data is verified through verification of the signatures of the respective data. The signature verification is executed using the server public key acquired from the server certificate.

In step S391, the signatures of these respective data are verified so as to check the validity of the data.

In step S391, if the validity of the token and the use control information is not verified, the determination in step S391 results in "No," the flow proceeds to step S395, and the subsequent processes are halted. In this case, reproduction of content is not performed.

In step S391, if the validity of the token and the use control information is verified, the determination in step S391 results in "Yes," and the flow proceeds to the next step S392.

In step S392, the CPS unit key (title key) used for decoding content is acquired.

In addition, as described above with reference to FIGS. 8A to 8C and the like, for the reproducing device to acquire the CPS unit key (title key), the reproducing device reads the binding key recorded in the protected area of the memory card, generates the volume unique key using the medium ID, and decodes the encrypted CPS unit key (encrypted title key) using the generated volume unique key to thereby acquire the CPS unit key (title key).

Thereafter, in step S393, the encrypted content is decoded using the acquired CPS unit key (title key), and the content is reproduced.

As described above, in this processing example, in order to reproduce content, it is necessary to perform a series of processes of verifying the content management data in addition to the token received from the server to check the validity of the respective management data, verifying the validity of the content and the server based on the management data, and acquiring the CPS unit key (title key) for decoding the content using the binding key received from the server to thereby decode the encrypted content.

Moreover, as for the content revocation list (CRL) and the server revocation list (SRL) used for verifying the validity of the content and the server, (a) the version of the content revocation list (CRL) and the server revocation list (SRL) stored in the memory of the reproducing device and (b) the version of the content revocation list (CRL) and the server revocation list (SRL) which are downloaded from the server as the management data corresponding to the reproduction target content and stored in the memory card are limited to those of the versions equal to or greater than the minimum allowable versions recorded in the token. That is, it is inhibited to determine the validity of the content and server using old lists of the versions lower than the minimum allowable versions recorded in the token and to proceed to the reproducing process.

In addition, these reproducing process sequences are executed in accordance with the reproduction processing program maintained by the reproducing device.

Moreover, the process described with reference to FIGS. 16 and 17 is applied not only to when both the content and the content management data are downloaded from the server but is also executed when content is copied from other media, for example, the content recording disc shown in FIG. 1A, to the memory card, and the management data corresponding to the content are acquired from the server.

[7. Configuration and Process for Restricting Access to Protected Area of Memory Card]

As described above with reference to FIG. 6, the memory card includes a nonprotected area (User Area) in which unrestricted access is permitted and a protected area.

In the following description, a configuration for restricting access to the protected area of the memory card and a specific process example will be described.

Writing of data to the protected area of the memory card and reading of data from the protected area are restricted.

Specifically, the availability of the writing process and the reading process is set as access control information for each access requesting device (the server, the recording and reproducing device (host), and the like) and for each of the segment areas (#1, #2, and the like).

The setting information is recorded in the device certificate of each device. The device certificate is a certificate issued by the authentication station that has a signature of the authentication station.

Specifically, if the device is a server, the certificate is the server certificate (Server Cert) described above with reference to FIG. 5. The recording and reproducing device (host) has also the host certificate (Host Cert) issued by the authentication station, and access control information is recorded in the certificate.

These certificates are signed by the authentication station and have an anti-falsification system. That is, the validity (falsification) can be verified through signature verification.

The memory card verifies a writable area and a readable area permitted to the respective devices by referencing the certificate received from an access requesting device. For example, the server certificate (Server Cert) described with reference to FIG. 5 is referenced if the device is a server, and the host certificate (Host Cert) which is a certificate of the recording and reproducing device (host) is referenced if the device is a recording and reproducing device (host).

For example, in the case of the data writing process, the data processing unit of the memory card verifies the writable area based on the data recorded in the certificate which the memory card received from the access requesting device and writes data to the verified writable area. For example, the binding key described above with reference to FIG. 6 is written.

Similarly, in the case of the data reading process, the readable area is identified based on the data recorded in the certificate of the access requesting device, and data are read from the identified readable area.

For example, the binding key described above with reference to FIG. 6 is written to a segment area in which the server is permitted to write based on an access request from the server.

The binding key is data which is necessary when the recording and reproducing device (host) executes a content reproducing process. The recording and reproducing device (host) needs to maintain a certificate (host certificate) in which it is permitted to read data from the segment area in which the binding key is written.

When the recording and reproducing device (host) executes a content reproducing process, the recording and reproducing device (host) transmits a host certificate to the memory card. The data processing unit of the memory card verifies the validity of the host certificate through signature verification and then references information on permission to access the protected area recorded in the host certificate to check if information on permission to read data from the segment area in which the binding key is written is recorded. Then, the data processing unit of the memory card reads the binding key and provides the same to the recording and reproducing device (host) only when the read permission information is recorded.

Figure 18:
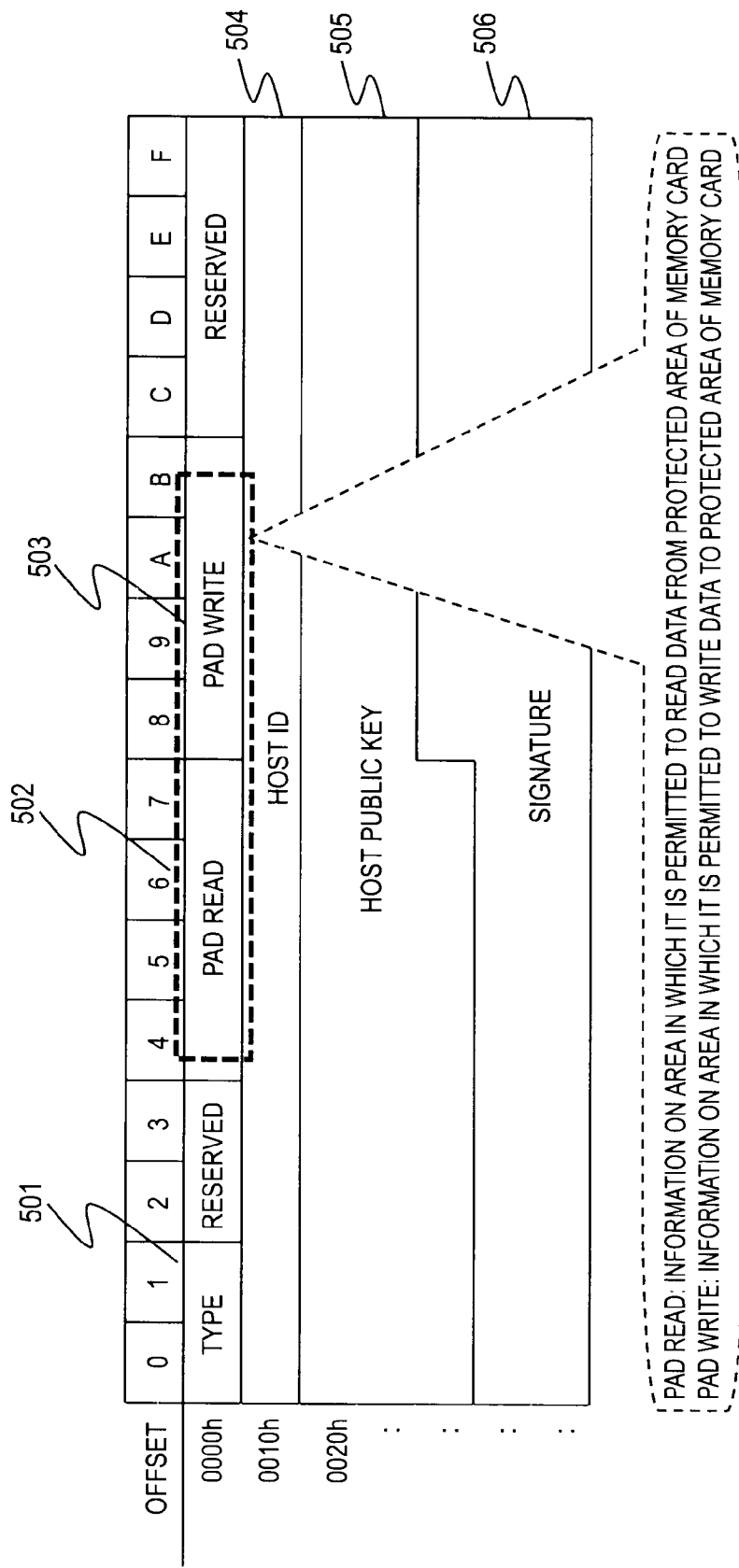
FIG. 18 is a diagram illustrating an example of a host certificate possessed by a recording and reproducing device (host).

An example of the host certificate possessed by the recording and reproducing device (host) is shown in FIG. 18.

FIG. 18 shows an example of the host certificate (Host Cert) possessed by the recording and reproducing device (host) that executes a content reproducing process. As shown in FIG. 18, the following data are recorded in the host certificate (Host Cert).

Type

In type information (Type) 501, type information of a certificate, host information, and the like are recorded. For example, information and the like on whether the host is a PC, a recording and reproducing device, a recording device, or a reproducing device are recorded.

PAD Read

Readable area information (PAD Read) 502 is information indicating a segment area in which it is permitted to read data from the protected area (PA) of the memory card.

PAD Write

Writable area information (PAD Write) 503 is information indicating a segment area in which it is permitted to write data to the protected area (PA) of the memory card.

Host ID

Host ID 504 is an area in which a host ID which is the identifier of a host is recorded.

Host Public Key

A host public key 505 is an area in which the public key of the host is stored.

Signature

A signature 506 is signature data in which the constituent data of the host certificate are signed with the private key of the authentication station.

These data are recorded.

In addition, these data are also recorded in the server certificate described above with reference to FIG. 5.

An example of setting access restriction when the device requesting access to the memory card is a server and a host device such as a recording and reproducing device will be described with reference to FIG. 19.

Figure 19:
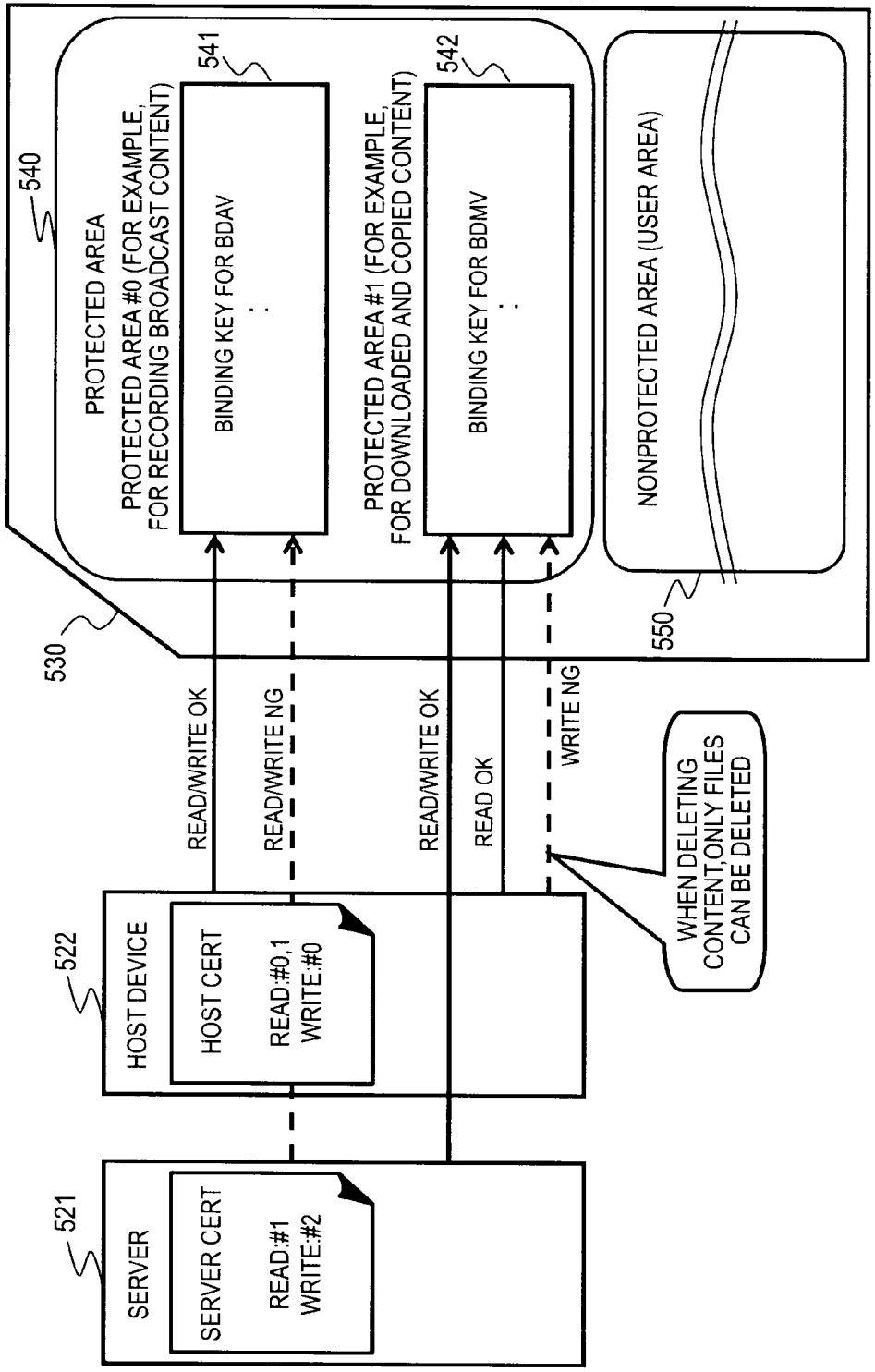
FIG. 19 is a diagram illustrating a setting example of access restriction when the device requesting access to a memory card is a server and a host device such as a recording and reproducing device, respectively.

In FIG. 19, a server 521 which is a device requesting access to a memory card, a host device 522, and a memory card 530 are shown from left to right.

The server 521 is a server that writes a binding key necessary when reproducing the above-described downloaded content or content copied from a disc.

The host device 522 is a device that reproduces content stored in the memory card and is a device that needs to acquire a binding key recorded on the memory card in order to decode content.

The memory card 530 includes a protected area 540 and a nonprotected area (User Area) 550, and encrypted content and the like are recorded in the nonprotected area (User Area) 550.

The binding key is recorded in the protected area 540.

As described above with reference to FIG. 6, the protected area 540 is segmented into a plurality of areas.

In FIG. 19, an example in which the protected area 540 has two segment areas of a segment area #0 (Protected Area #0) 541 and a segment area #1 (Protected Area #1) 542 is shown.

The segment area #0 (Protected Area #0) 541 is set as an area in which a binding key as key data of broadcast content is recorded.

The segment area #1 (Protected Area #1) 542 is set as an area in which a binding key as key data of downloaded and copied content is recorded.

In such a setting, the binding key provided by the server described above with reference to FIGS. 8A to 8C is recorded in the segment area #1 (Protected Area #1) 542.

In this case, the writable area information (PAD Write) recorded in the server certificate of the server is configured as a certificate in which permission to write data to the segment area #1 (Protected Area #1) is set.

In the example shown in the drawing, the segment area in which writing is permitted is also set to permit reading.

moreover, the host certificate maintained by the host device 522 which is the reproducing device that reads the binding key recorded in the segment area #1 (Protected Area #1) 542 and executes a content reproducing process is configured as a certificate in which only permission to read data from the segment area #1 (Protected Area #1) is set.

In the host certificate, permission to write data to the segment area #1 (Protected Ara #1) is not set.

However, in order to enable deletion of a binding key corresponding to deleted content when deleting content, a deleting process may be permitted.

That is, the data processing unit of the memory card may determine the permissibility of a request from an access requesting device to write and read data to/from the protected area 540 based on the device certificate of the writing device but may permit all deleting requests.

Alternatively, in addition to the permission information on the respective processes of writing and reading data with respect to each segment area, permission information on a deleting process may be recorded in the certificate of the access requesting device, and the availability of deletion may be determined based on this recording information.

In the example shown in FIG. 19, the segment area #0 (Protected Area #0) 541 of the memory card 530 is set as an area in which a binding key as key data of broadcast content is recorded.

The broadcast content are received from a broadcast station by the host device 522, such as, for example, a recorder or a PC, having the function of receiving and recording broadcast data and are recorded in a medium.

In this case, the binding key which is the key information used for decoding the broadcast content is provided by the broadcast station and received by the host device 522. The host device 522 accesses the memory card 530 and records the key data for broadcast content in the protected area 540 of the memory card 530.

In this example, an area for recording the key data for broadcast content is defined in advance as the segment area #0 (Protected Area #0) 541.

In the protected area 540 of the memory card 530, as described above, the type of recording data can be defined in advance for each segment area (#0, #1, #2, and the like).

The memory card determines the type of data requested for writing or reading in response to a data write or read request from the access requesting device and selects the segment area (#0, #1, #2, and the like) to be used as the data writing destination or the data reading destination.

The binding key which is the key information used for decoding broadcast content is written by the host device 522 and is also read by the host device 522 during the reproducing process.

Therefore, the host certificate maintained by the host device 522 is configured as a certificate in which permission to both write and read data to the segment area #0 (Protected Area #0) 541 defined as a recording area of the key data for broadcast content is set.

The host certificate (Host Cert) maintained by the host 522 shown in FIG. 19 is a certificate in which it is set such that readable areas are the segment areas #0 and #1 and a writable area is the segment area #0 as shown in the drawing.

On the other hand, the server 521 is not permitted to both write and read data to/from the segment area #0 (Protected Area #0) 541 defined as a recording area of the key data for broadcast content, and information on non-permission to write and read data is recorded in the server certificate.

The server certificate (Server Cert) maintained by the server 521 shown in FIG. 19 is a certificate in which it is set such that a readable area is the segment area #1 and a writable area is the segment area #1 as shown in the drawing.

As described above, in the protected area of the memory card, the information on permissibility or impermissibility to write and read data is set as access control information for each access requesting device and for each segment area (#0, #1, #2, and the like).

The access control information is recorded in the certificates (the server certificate, the host certificate, and the like) of the respective access requesting devices. The memory card first performs signature verification on the certificate received from the access requesting device to check the validity thereof and reads the access control information including the readable area information (PAD Read) and the writable area information (PAD Write), described in the certificate. Moreover, based on the information, the memory card permits only the process permitted to the access requesting device and executes the process.

In addition, there are various types of host devices, for example, a CE device such as a recorder or a player, and a PC.

The device certificates are certificates which the individual devices possess and which can be set differently in accordance with the types of these devices.

Moreover, the data processing unit of the memory card may determine the accessibility for each segment area of the protected area based on the type information (Type) 501 described with reference to FIG. 18 as well as the readable area information (PAD Read) and the writable area information (PAD Write) recorded in the device certificate.

Figure 20:
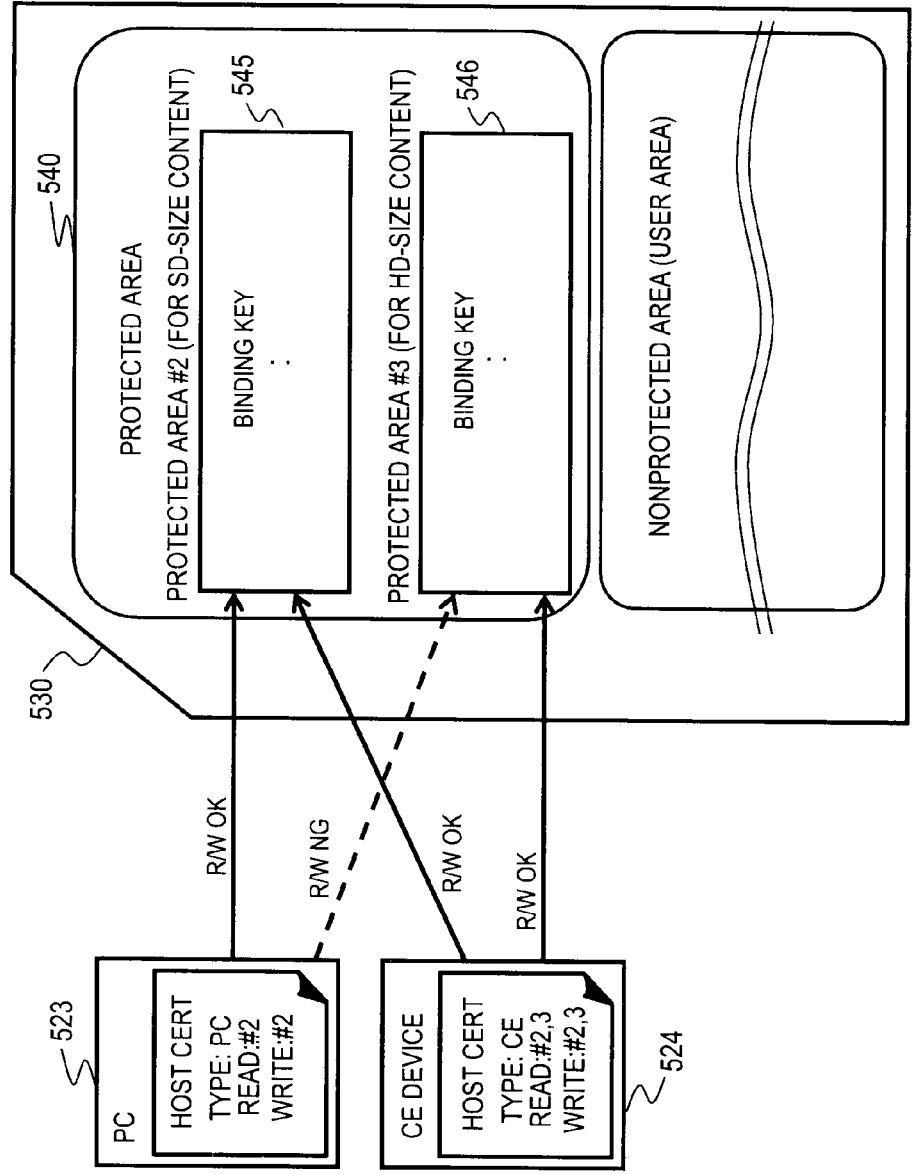
FIG. 20 is a diagram illustrating a setting example of access restriction when the device requesting access to a memory card is a PC and a CE device, respectively.

In FIG. 20, a PC 523 as the host device that records data on the memory card 530 and reads data recorded on the memory card 530 and a CE (Consumer Electronics) device 524 such as a recorder or a player are shown.

Moreover, the protected area 540 of the memory card 530 shown in FIG. 20 has the following segment areas.

A segment area #2 (Protected Area #2) 545 is set as an area in which a binding key which is the key data of content corresponding to SD (Standard Definition: standard image quality) image data is recorded.

A segment area #3 (Protected Area #3) 546 is set as an area in which a binding key which is the key data of content corresponding to HD (High Definition: high image quality) image data is recorded.

The host certificate (Host Cert) maintained by the PC 523 shown in FIG. 20 is a certificate in which it is set such that the device type is PC, a readable area is the segment area #2 and a writable area is the segment area #2 as shown in the drawing.

Moreover, the host certificate (Host Cert) maintained by the CE device 524 is a certificate in which it is set such that the device type is CE, readable areas are the segment areas #2 and #3, and writable areas are the segment areas #2 and #3 as shown in the drawing.

That is, the PC 523 is only permitted to write and read data to/from the segment area #2 (Protected Area #2) 545 which is an area in which the binding key which is the key data of content corresponding to SD (Standard Definition: standard image quality) image data is recorded. The PC 523 is not permitted to write and read data to/from the segment area #3 (Protected Area #3) 546 which is an area in which the binding key which is the key data of content corresponding to HD (High Definition: high image quality) image data is recorded.

Moreover, the CE device 524 is only permitted to write and read data to/from the segment area #2 (Protected Area #2) 545 which is an area in which the binding key which is the key data of content corresponding to SD (Standard Definition: standard image quality) image data is recorded. Moreover, the CE device 524 is also permitted to write and read data to/from the segment area #3 (Protected Area #3) 546 which is an area in which the binding key which is the key data of content corresponding to HD (High Definition: high image quality) image data is recorded.

As described above, as for the host device, the access control information can be set in accordance with the type of the device.

In addition, information identifying whether the host device is a PC or a CE device is also included in the type information of the host certificate. The data processing unit of the memory card may determine the accessibility (availability of reading/writing) to the segment area based on the access control information, namely the readable area information (PAD Read) and the writable area information (PAD Write), recorded in the device certificate and may determine the accessibility for each segment area of the protected area based on the type information (Type).

As described with reference to FIGS. 19 and 20, the plurality of segment areas set in the protected area 540 of the memory card 530 can be configured as areas in which contents requiring different security levels are stored. For example, premium content and broadcast recording content, or SD-size content and HD-size content may be stored in different segment areas.

The use type of each segment area can be flexibly controlled by setting such that either recording or reproducing is permitted in accordance with devices having different security levels. That is, different use types are applied to a server and a client, or a PC and a CE device.

In addition, for example, when it is desired to change the access right of a specific device such as a server or a host device, an attribute may be added to the certificate.

As a specific method of changing the access right, for example, as a process when adding a right to a certain host device, the following methods can be considered.

(1) A new key and a new certificate in which an attribute is added are issued to a host device of which the right is to be changed, and the old key and certificate of the host device are revoked to update the key and certificate.

Alternatively, a host device may have two or more valid keys and certificates.

(2) Only an additional certificate in which an attribute is added is issued, and only the certificate of the host device is updated.

(3) Only an additional certificate in which an attribute that is to be added is described is issued.

However, in this case, the host device has a plurality of certificates for one key.

For example, the access right of a specific device can be changed by the above-described methods (1) to (3).

[8. Example of Hardware Configuration of Respective Devices]

Finally, an example of a hardware configuration of the respective devices that perform the above-described processes will be described with reference to FIGS. 21 and 22.

First, an example of a hardware configuration of the host device that loads a memory card therein and performs data recording and reproducing processes will be described with reference to FIG. 21.

A CPU (Central Processing Unit) 701 functions as the data processing unit that executes various processes in accordance with the program stored in a ROM (Read Only Memory) 702 or a storage unit 708. For example, the CPU 701 executes communication with the server, recording of data received from the server on the memory card (a removable medium 711 in the drawing), reproducing of data from the memory card (the removable medium 711 in the drawing) described in the respective embodiments. The program executed by the CPU 701, data, and the like are appropriately stored in a RAM (Random Access Memory) 703. The CPU 701, the ROM 702, and the RAM 703 are connected to each other by a bus 704.

The CPU 701 is connected to an input/output interface 705 through the bus 704. The input/output interface 705 is connected to an input unit 706 including various switches, a keyboard, a mouse, and a microphone and an output unit 707 including a display and a speaker. The CPU 701 executes various processes in accordance with instructions input from the input unit 706 and outputs the processing results, for example, to the output unit 707.

The storage unit 708 connected to the input/output interface 705 is formed of a hard disk, for example, and stores the program executed by the CPU 701 and various data. A communication unit 709 communicates with external devices through a network such as the Internet or a local area network.

A drive 710 connected to the input/output interface 705 drives the removable medium 711 such as a magnetic disc, an optical disc, an opto-magnetic disc, or a semiconductor memory to acquire various data such as content or key information recorded thereon. For example, the content is decoded and reproduced in accordance with a reproducing program executed by the CPU using the acquired content and key data.

FIG. 22 shows an example of a hardware configuration of the memory card.

A CPU (Central Processing Unit) 801 functions as the data processing unit that executes various processes in accordance with the program stored in a ROM (Read Only Memory) 802 or a storage unit 807. For example, the CPU 801 executes communication with the server and the host device, writing and reading of data to/from the storage unit 807, determination on the accessibility for each segment area of a protected area 811 of the storage unit 807 described in the respective embodiments. The program executed by the CPU 801, data, and the like are appropriately stored in a RAM (Random Access Memory) 803. The CPU 801, the ROM 802, and the RAM 803 are connected to each other by a bus 804.

The CPU 801 is connected to an input/output interface 805 through the bus 804. The input/output interface 805 is connected to a communication unit 806 and the storage unit 807.

A communication unit 804 connected to the input/output interface 805 communicates with the server and the host device, for example. The storage unit 807 is a data storage area, and as described above, includes the protected area 811 in which access restriction is set and a nonprotected area 812 in which data can be freely recorded and read.

Figure 21:
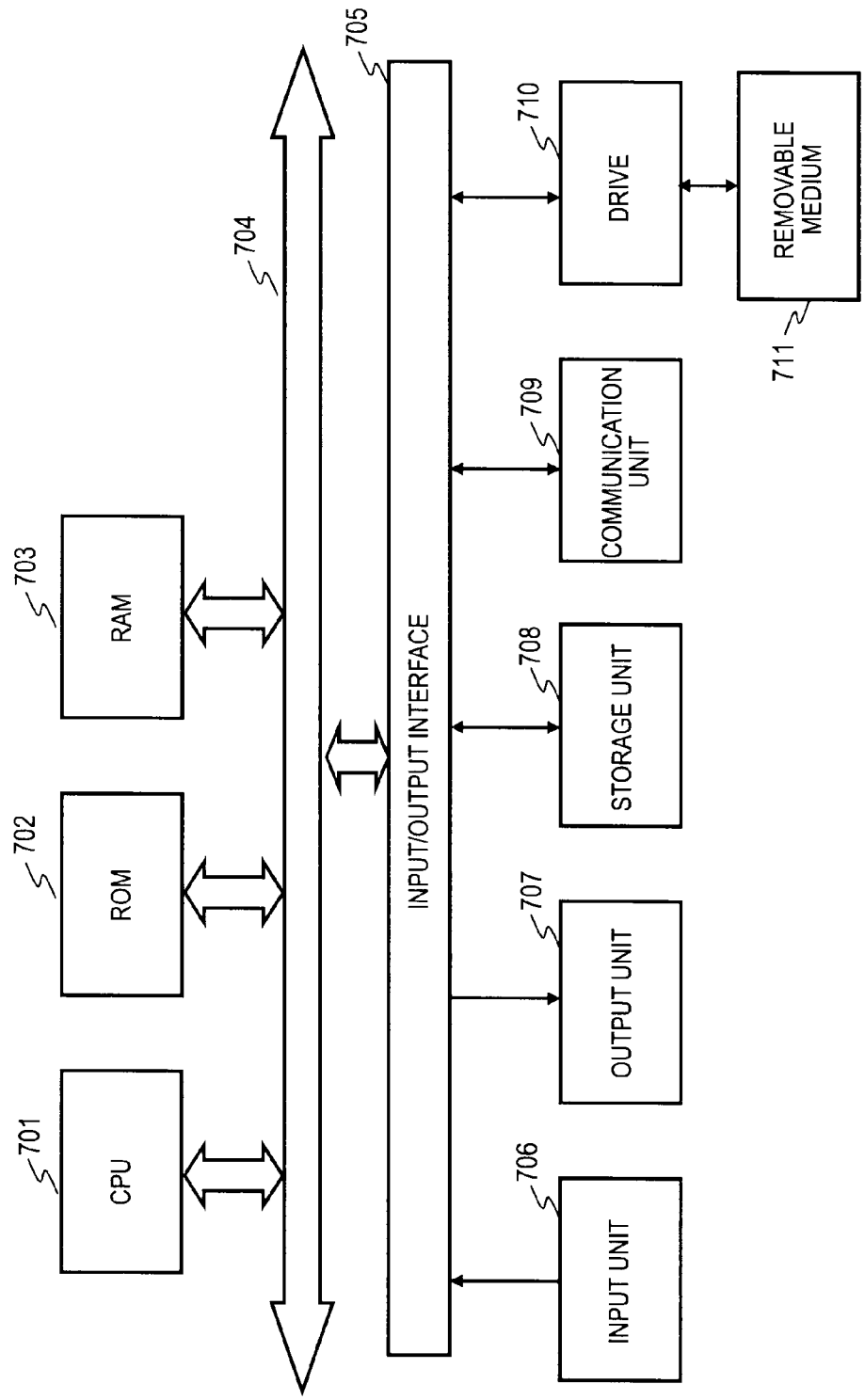
FIG. 21 is a diagram illustrating an example of a hardware configuration of a host device that loads a memory card therein and performs data recording and reproducing processes.

The server can be realized by a device having the same hardware configuration as the host device shown in FIG. 21, for example.

The present disclosure has been hitherto described with reference to specific embodiments. However, it is obvious to those skilled in the art that the embodiments can be modified in various forms without departing from the spirit and scope of the present disclosure. That is, the present disclosure has been described exemplarily but this should not be taken as definitive. The spirit and scope of the present disclosure can be understood from the appended claims.

The series of processes described in this specification can be performed by hardware, software, or a combination thereof. When the processes are performed by software, a program including the process sequence can be installed in and executed by a memory of a computer assembled into exclusive hardware. Alternatively, the program can be installed in and executed by a general-purpose computer performing various processes. For example, the program can be recorded in a recording medium in advance. The program can be installed not only in a computer from a recording medium but may be also received through a network such as a LAN (Local Area Network) and the Internet and installed in a recording medium such as a built-in hard disk.

The various processes described in this specification can be performed consecutively in the described order or may be performed in parallel or individually depending on the processing capability of the device performing the processes or as necessary. The system in this specification is a logical set of plural devices and is not limited to a configuration in which the plural devices are disposed in the same housing.

As described above, according to the embodiments of the present disclosure, a system that controls writing and reading of data to/from an access restricted area set in a medium is provided. The information processing device according to the embodiment of the present disclosure includes a memory having a protected area which is a data recording area in which access restriction is set; and a data processing unit that determines accessibility in response to a request for accessing the protected area from an access requesting device. The data processing unit verifies a device certificate received from the access requesting device and determines accessibility to the protected area based on access control information recorded in the device certificate. For example, the availability of writing and reading of data to/from each of the segment areas of the protected area is determined based on the access control information for each segment area of the protected area. Through this process, the access of each device to each segment area is controlled.

The present disclosure contains subject matter related to that disclosed in Japanese Priority Patent Application JP 2010-143361 filed in the Japan Patent Office on Jun. 24, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a memory having a protected area which is a data recording area in which access restriction is set; and
circuitry configured to:
   determine accessibility in response to a request for accessing the protected area from an access requesting device; and
   verify a device certificate received from the access requesting device and determine accessibility to each segment area of the protected area based on access control information for each of the segment areas of the protected area recorded in the device certificate,
wherein the access control information includes a type of device of the access requesting device and a type of data to be read or written to the protected area.

2. The information processing device according to claim 1, wherein the circuitry is further configured to verify the device certificate received from the access requesting device and determine availability of a data writing process and a data reading process on each segment area of the protected area based on the access control information of the data writing process and the data reading process for each of the segment areas of the protected area recorded in the device certificate.

3. The information processing device according to claim 1, wherein the circuitry is further configured to verify the device certificate received from the access requesting device and determine accessibility to each segment area of the protected area based on type information of the access requesting device recorded in the device certificate.

4. The information processing device according to claim 1, wherein the circuitry is further configured to verify a signature set in the device certificate received from the access requesting device and determine accessibility to the protected area based on the access control information recorded in the device certificate only when the validity of the device certificate is confirmed through signature verification.

5. The information processing device according to claim 1, wherein the circuitry is further configured to record key information which is used for reproducing encrypted content in a segment area within the protected area, which is determined to be a data writable area based on the device certificate received from the access requesting device.

6. The information processing device according to claim 5, wherein the circuitry is further configured to record the key information which is used for reproducing encrypted content in a segment area within the protected area, which is determined to be the data writable area based on a server certificate received from a server that provides content management data.

7. The information processing device according to claim 6, wherein the circuitry is further configured to execute a process of reading the key information used for reproducing encrypted content from the segment area within the protected area, which is determined to be a data readable area based on a host certificate received from a host device that executes a content reproducing process and providing the read key information to the host device.

8. The information processing device according to claim 1, wherein the protected area is segmented into a plurality of segment areas, and
wherein the circuitry is further configured to execute a recording process using different segment areas depending on the type of recording data.

9. The information processing device according to claim 1, wherein the information processing device is a flash memory-type memory card.

10. A data recording control system comprising:
a server that provides key information which is used for reproducing encrypted content; and
an information processing device that records data provided by the server,
wherein the information processing device includes
a memory having a protected area which is a data recording area in which access restriction is set, and
circuitry configured to:
determine accessibility in response to a request for accessing the protected area from the server, and
verify a server certificate received from the server, select a segment area of the protected area in which the server is permitted to write data based on access control information for each of the segment areas of the protected area recorded in the server certificate, and record the key information in the selected segment area, and
wherein the access control information includes type of access device information and a type of data to be read or written to the protected area.

11. An information processing method for executing access control in an information processing device which includes a memory having a protected area which is a data recording area in which access restriction is set, the method comprising:
permitting data processing circuitry to determine accessibility in response to a request for accessing the protected area from an access requesting device,
wherein the permitting involves verifying a device certificate received from the access requesting device and determining accessibility to each segment area of the protected area based on access control information for each of the segment areas of the protected area recorded in the device certificate, and
wherein the access control information includes a type of device of the access requesting device and a type of data to be read or written to the protected area.

12. A non-transitory computer readable medium storing a program for executing access control in an information processing device which includes a memory having a protected area which is a data recording area in which access restriction is set, the program comprising:
permitting a data processing unit to determine accessibility in response to a request for accessing the protected area from an access requesting device,
wherein the permitting involves verifying a device certificate received from the access requesting device and determining accessibility to each segment area of the protected area based on access control information for each of the segment areas of the protected area recorded in the device certificate, and
wherein the access control information includes a type of device of the access requesting device and a type of data to be read or written to the protected area.

* * * * *